April 11, 1944.　　F. R. SAXBY　　2,346,616
MULTIPLYING MACHINE
Filed May 7, 1941　　13 Sheets-Sheet 1
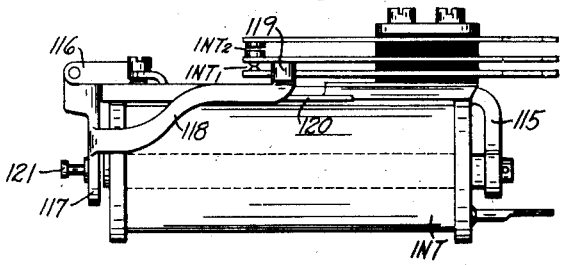
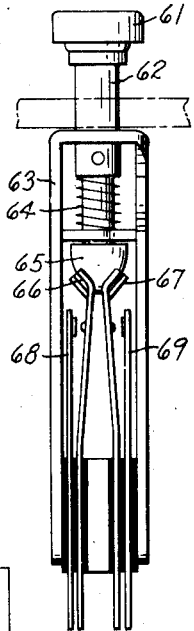
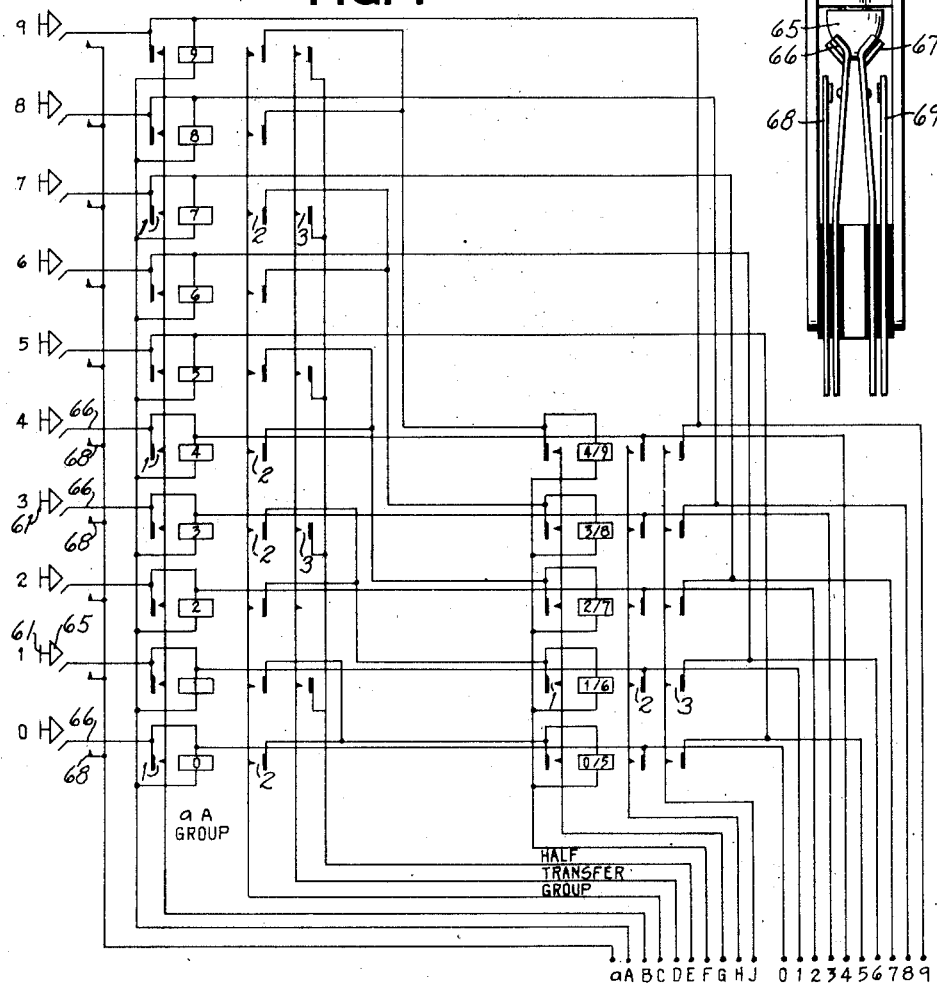
Frank Reginald Saxby
Inventor
By Carl Bennett
His Attorney

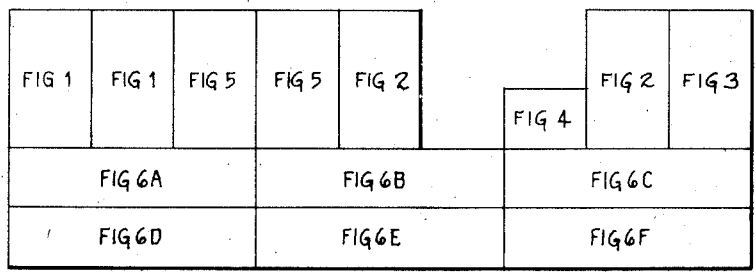
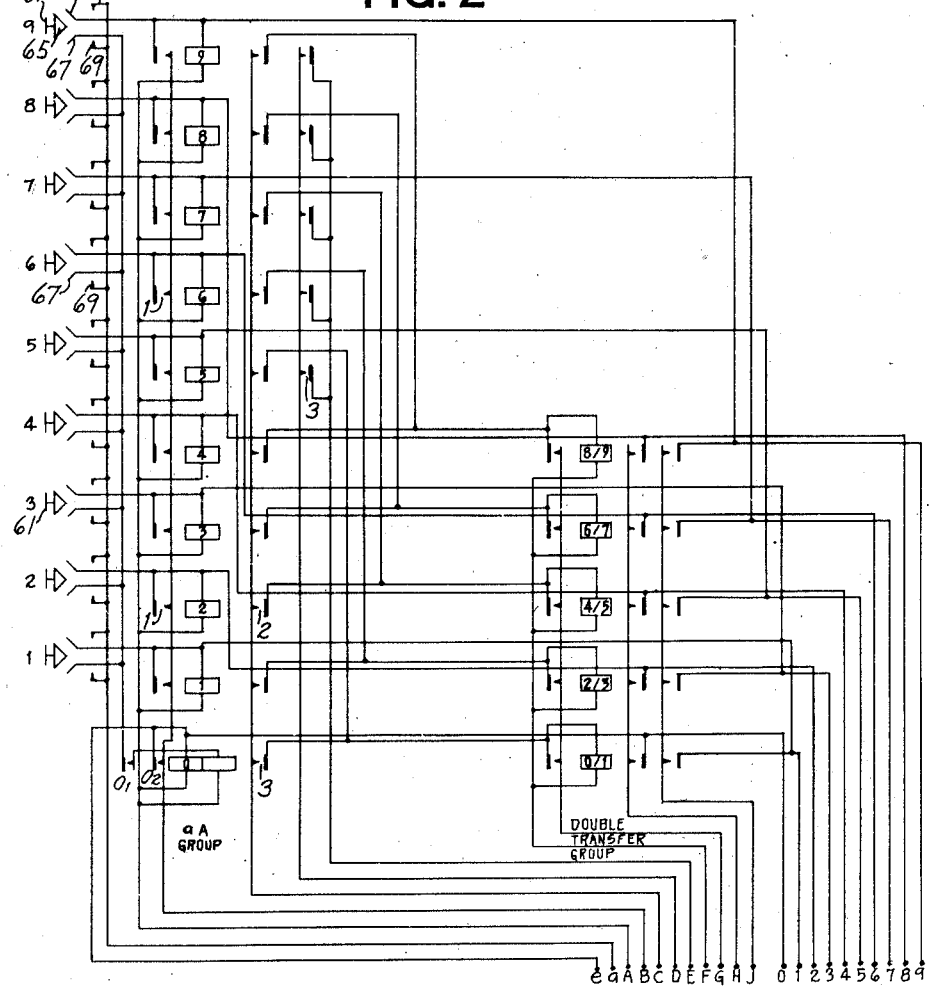

April 11, 1944.  F. R. SAXBY  2,346,616
MULTIPLYING MACHINE
Filed May 7, 1941  13 Sheets-Sheet 3

Frank Reginald Saxby
Inventor

By *Carl Benst*
His Attorney

April 11, 1944.                F. R. SAXBY                2,346,616

MULTIPLYING MACHINE

Filed May 7, 1941                13 Sheets-Sheet 4

Frank Reginald Saxby
Inventor

By    *Earl Benst*

His Attorney

April 11, 1944.   F. R. SAXBY   2,346,616
MULTIPLYING MACHINE
Filed May 7, 1941   13 Sheets-Sheet 5
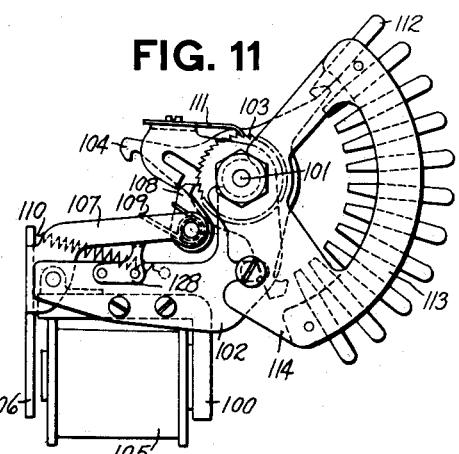
FIG. 11
FIG. 5
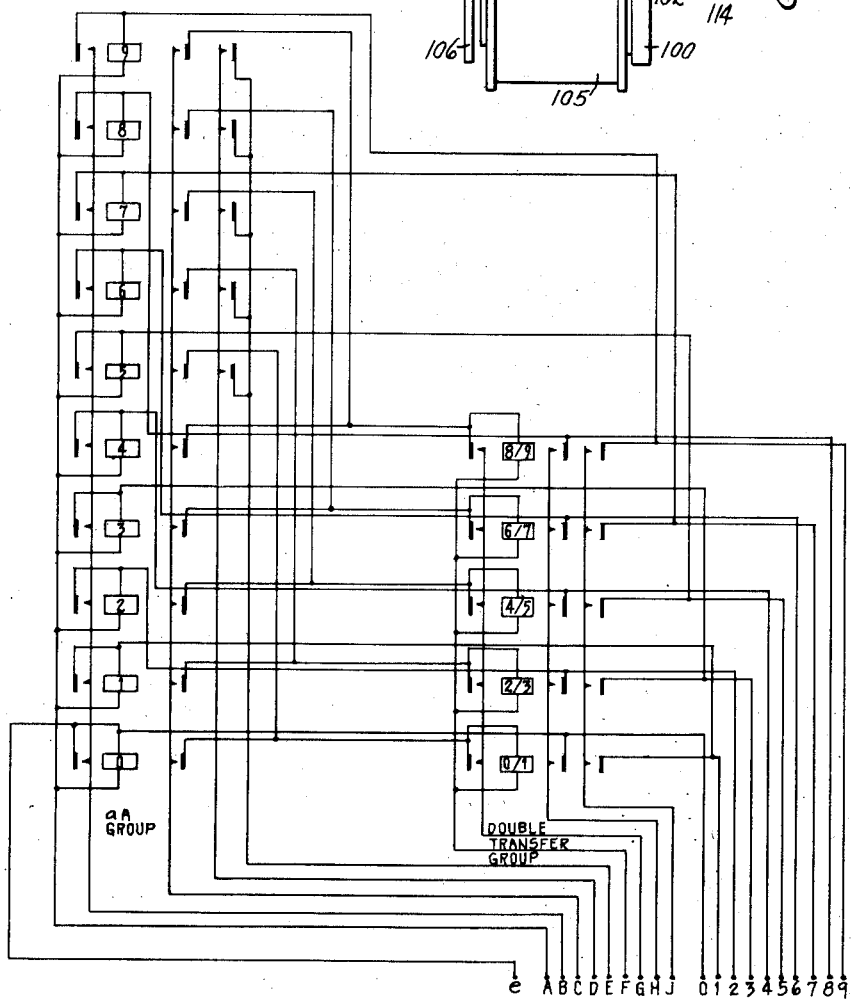
Frank Reginald Saxby
Inventor
By *Carl Beust*
His Attorney

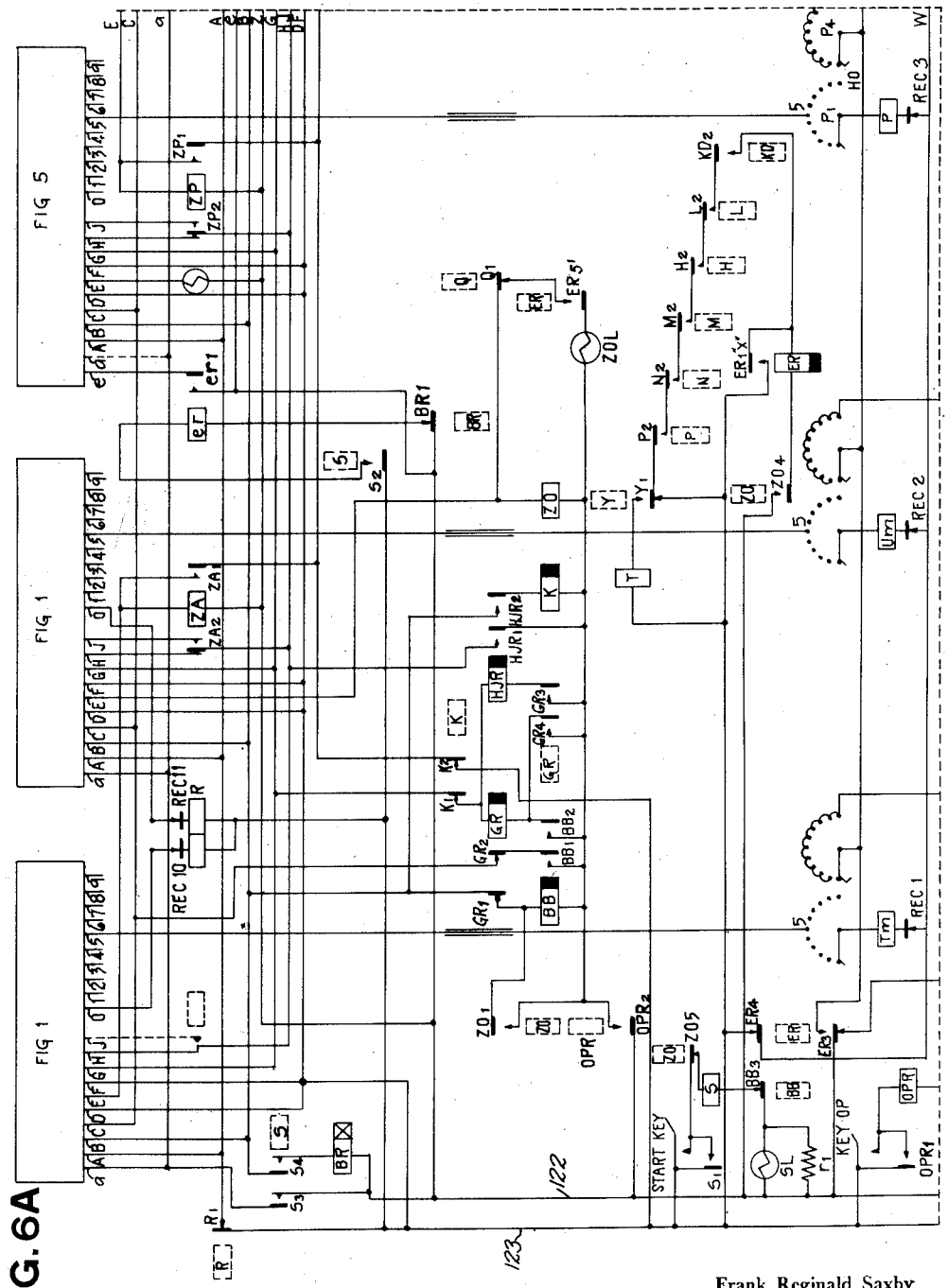

April 11, 1944.   F. R. SAXBY   2,346,616
MULTIPLYING MACHINE
Filed May 7, 1941   13 Sheets-Sheet 7

Frank Reginald Saxby
Inventor
By
His Attorney

April 11, 1944.  F. R. SAXBY  2,346,616
MULTIPLYING MACHINE
Filed May 7, 1941  13 Sheets-Sheet 8

Frank Reginald Saxby
Inventor

By *Earl Beust*
His Attorney

April 11, 1944.   F. R. SAXBY   2,346,616
MULTIPLYING MACHINE
Filed May 7, 1941    13 Sheets-Sheet 12

FIG. 13A

| | TM HALF TRANSFER αA / SIGNAL RELAY | UM HALF TRANSFER αA / SIGNAL RELAY | P DOUBLE TRANSFER αA / CONTR'L RELAY | N DOUBLE TRANSFER αA / CONTR'L RELAY | M DOUBLE TRANSFER αA / CONTR'L RELAY |
|---|---|---|---|---|---|
| 1 | | | 0 | 0 | 0 |
| 2 | 3⟶ ZA | 6 | 0 | 0 | 2 |
| 3 | 3⟶1/6  ZA | 6⟶3/8 | 0⟶0/1 | 0⟶0/1 | 2⟶4/5 |
| 4 | 1/6  ZA | 3/8 | 0/1 | 0/1 | 4/5 |
| 5 | 1⟵1/6  Z'A | 8⟵3/8 | 0⟵0/1 | 0⟵0/1 | 5⟵4/5  Z'N |
| 6 | 1  ZA | 8 | 0 | 0 | 5  ZN |
| 7 | 1⟶0/5  ZA | 8⟶4/9 | 0⟶0/1 | 0⟶0/1 | 5⟶0/1  ZN |
| 8 | 0/5  ZA | 4/9 | 0/1 | 0/1 | 0/1  ZN |
| 9 | 0⟵0/5  ZA | 9⟵4/9  Z'O | 0⟵0/1 | 1⟵0/1 | 0⟵0/1  ZN |
| 10 | 0 | 9  ZO | 0 | 1 | 0 |
| 11 | 0 | 9  ZO | 0 | 1 | 0 |
| 12 | 0 | 9 | 0 | 1 | 0 |
| 13 | 0⟶0/5 | 9⟶4/9  Z'O | 0⟶0/1 | 1⟶2/3 | 0⟶0/1 |
| 14 | 0/5 | 4/9 | 0/1 | 2/3 | 0/1 |
| 15 | 0⟵0/5 | 4⟵4/9 | 0⟵0/1 | 2⟵2/3 | 1⟵0/1 |
| 16 | 0 | 4 | 0 | 2 | 1 |
| 17 | 0 | 1  ZO | 0 | 8  ZP | 5  ZN |
| 18 | 0 | 1  ZO | 0 | 8  ZP | 5  ZN |
| 19 | 0 | 1 | 0 | 8  ZP | 5  ZN |
| 20 | 0⟶0/5 | 1⟶0/5  Z'O | 0⟶0/1 | 8⟶6/7  ZP | 5⟶0/1  ZN |
| 21 | 0/5 | 0/5 | 0/1 | 6/7  ZP | 0/1  ZN |
| 22 | 0⟵0/5 | 0⟵0/5 | 1⟵0/1 | 7⟵6/7 | 0⟵0/1  ZN |
| 23 | R | | | | |

Inventor
FRANK REGINALD SAXBY
BY Carl Beust
HIS Attorney

FIG. 13B

| H DOUBLE TRANSFER / CONTR'L RELAY aA | L DOUBLE TRANSFER / CONTR'L RELAY aA | KD DOUBLE TRANSFER / CONTR'L RELAY aA | OPERATION CONTROL RELAYS | PRODUCT REGISTER P N M H L KD |
|---|---|---|---|---|
| 0 | 0 | 0 | S, er | 0 0 0 0 0 0 |
| 1 ──→ Z M | 3 | 4 | S, er | |
| 1 ──→ O/1   Z M | 3 ──→ 6/7 | 4 ──→ 8/9 | OPR, BB | |
| O/1   Z M | 6/7 | 8/9 | OPR, GR | |
| 0 ←── O/1   Z M | 6 ←── 6/7   Z'H | 8 ←── 8/9   Z'L | OPR, GR, HJR | |
| 0 | 6   Z H | 8   Z L | OPR, K | |
| 0 ──→ O/1 | 6 ──→ 2/3   Z H | 8 ──→ 4/5   Z L | OPR, BB | |
| O/1 | 2/3   Z H | 4/5   Z L | OPR, GR | |
| 1 ←── O/1   Z'M | 3 ←── 2/3   Z H | 4 ←── 4/5   Z L | OPR, GR, HJR | |
| 1 | Z M   3 | 4 | OPR, K | |
| 1 | Z M   3 | 4 | OPR, ZO SHORTS BB  ZO CAUSES ENTRY | 0 1 0 1 3 4 |
| 1 | Z M   3 | 4 | OPR, ER SHORTS ZO | |
| 1 ──→ O/1   Z M | 3 ──→ 6/7 | 4 ──→ 8/9 | OPR, BB | |
| O/1   Z M | 6/7 | 8/9 | OPR, GR | |
| 0 ←── O/1   Z M | 6 ←── 6/7   Z'H | 8 ←── 8/9   Z'L | OPR, GR, HJR | |
| 0 | 6   Z H | 8   Z L | OPR, K | |
| 0 | 6   Z H | 8   Z L | OPR, K | |
| 0 | 6   Z H | 8   Z L | OPR, ZO SHORTS BB  ZO CAUSES ENTRY  ─Y←── COKD ←  ─Y←── COL ←  ─Y←── COH ← | 0 9 5 1 9 0  0 9 5 1 0 0  0 9 5 0 0 0  0 9 6 0 0 0 |
| 0 | 6   Z H | 8   Z L | OPR, ER SHORTS ZO | |
| 0 ──→ O/1 | 6 ──→ 2/3   Z H | 8 ──→ 4/5   Z L | OPR, BB | |
| O/1 | 2/3   Z H | 4/5   Z L | OPR, GR | |
| 1 ←── O/1 | 3 ←── 2/3   Z H | 4 ←── 4/5   Z L | OPR, GR, HJR | |
| | | | OPR, R, K | 0 9 6 0 0 0 |

Inventor
FRANK REGINALD SAXBY
BY *Karl Beust*
HIS Attorney

Patented Apr. 11, 1944

2,346,616

UNITED STATES PATENT OFFICE 2,346,616

MULTIPLYING MACHINE

Frank Reginald Saxby, Eastcote, England, assignor to The National Cash Register Company, Dayton, Ohio, a corporation of Maryland Application May 7, 1941, Serial No. 392,372
In Great Britain May 13, 1940

18 Claims. (Cl. 235—61)

This invention relates to multiplying machines and in particular to the provision of a machine for performing multiplication by the method of multiplication known as duplation.

In this method, the multiplier is used as the basis of a convergent series of terms derived therefrom in a series of steps by dividing the multiplier by two and by dividing the result of this division to the nearest lower integer by two to obtain another result which is divided by two. These operations of dividing by two or halving are continued until the multiplier is reduced to unity.

Simultaneously with the formation of the series of terms based on the multiplier and in the same number of steps, a divergent series of terms is formed by multiplying the multiplicand by two, and the result of this multiplication is multiplied by two to obtain a second result, and this operation of doubling the previous result is repeated, so as to obtain as many terms in the divergent series as there are terms in the convergent series.

One or more of the terms of the divergent series are selected according to whether the values of their corresponding terms in the convergent series are odd, and the sum of the selected terms in the divergent series will equal the product.

This method of multiplying can be used when both factors are expressed entirely in the decimal notation, but it is particularly adapted for solving problems when one of the factors is not expressed entirely in the decimal notation, such as sterling currency. In other methods of multiplying, utilizing the successive addition of the multiplicand a number of times according to the digit values of the multiplier or utilizing multiplication tables from which partial products are derived according to multiplicand and multiplier values, considerable difficulty has been experienced when it was necessary to multiply a multiplicand consisting of several different notations by a multiplier containing tens and hundreds values, because the denominational shift of the multiplicand would require that the values comprising this term be revised. For instance, if a multiplicand of 7 pence were to be multiplied by a multiplier containing a tens value and a units value, in the multiplication involving the units value multiplier the multiplicand of 7 pence could be used, but when the tens value of the multiplier is to be used and the multiplicand value is shifted denominationally to represent ten times 7 pence, the value would no longer be 7 but would be 70 pence, which is equal to 5 shillings 10 pence, and an appropriate conversion to these notations must be made.

In multiplying by the instant method, the multiplicand is never multiplied by more than a units order value of two in any one operation, even though the multiplier may contain tens and hundreds values, so that when the multiplicand is a value expressed in different notations, as occurs in sterling currency, the conversions of terms of the multiplicand from one notation to another, as in the case given above, would not be necessary.

The above method of multiplying and its advantages when used to multiply two factors, one factor of which is expressed in the decimal notation and the other factor of which is expressed in different notations, will be illustrated by the following problem, in which a multiplicand of £2 13s. 4d. is to be multiplied by a multiplier of 36. After the series are formed as explained above, the following values will be had:

|  | £ | s. | d. |
|---|---|---|---|
| 36 | 2 | 13 | 4 |
| 18 | 5 | 6 | 8 |
| 9 | 10 | 13 | 4 |
| 4 | 21 | 6 | 8 |
| 2 | 42 | 13 | 4 |
| 1 | 85 | 6 | 8 |

If only those terms based on the multiplicand are considered which correspond to terms based on the multiplier and which are odd, we have only the terms £10, 13s. 4d. and £85 6s. 8d. These selected terms, when added together, equal £96 0s. 0d., or the product of 36×£2 13s. 4d.

From a consideration of the above series of terms for the multiplicand, it is clear that no conversion of terms from one notation to the other was required and that the only connection between notations was through usual transfer mechanism, which transferred a unit to the next higher notation whenever a notation completed a cycle. This same relation between notations also exists when the selected terms are added to form the final product.

It is an object of this invention, therefore, to provide a multiplying machine which performs multiplication by the method of multiplication known as "duplation."

Another object of this invention is to provide a multiplying machine for multiplying a factor expressed in a decimal notation and a factor expressed in different notations without converting the different notations into one notation.

Another object of the invention is to provide means which operate quickly to cause a multiplier value to be divided by two and a multiplicand value to be multiplied by two to form the necessary terms of a divergent and a convergent series of terms to be used in performing multiplication by the "duplation" method.

A further object of the invention is to provide means for storing a multiplier and means for storing a multiplicand, which means have associated therewith respectively a plurality of relays and circuits controlled thereby for halving the multiplier, and a plurality of relays and circuits controlled thereby for doubling the multiplicand and to provide sequence control means for emitting a single impulse to the circuits controlled by halving and doubling relays to enable simultaneous entry of amounts into the multiplier and multiplicand storing means.

A further object of the invention is to provide relay means and selective circuit connections to halve multiplier values and double multiplicand values and a plurality of sequentially operable relays for causing the halving and doubling operation to be completed during the time the sequence relays are operative.

A further object of the invention is to provide a multiplying machine having means for halving a multiplier and means for doubling a multiplicand, a plurality of sequentially operable relays operable in a repeated sequence to cause, in each sequence, halving and doubling to take place, and means for preventing another sequential operation of the relays when the multiplier is odd and simultaneously causing an entry of a multiplicand value in a product register, after which entry the sequential operation of the control relays is resumed and repeated until either another odd multiplier value occurs or the problem is finished.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 shows the storing means and the halving means for one denomination of the multiplier.

Fig. 2 shows the storing means and the doubling means for one decimal denomination of the multiplicand.

Fig. 5 shows the storing means and the doubling means for an overflow denomination used with the multiplicand.

Figs. 6A, 6B, 6C, 6D, 6E, and 6F taken together and with Figs. 1, 2, 3, 4, and 5 show the circuits involved in the performance of a multiplication problem.

Fig. 7 shows a side elevation of one of the keys used to set up amounts or used as a control key.

Figure 8:
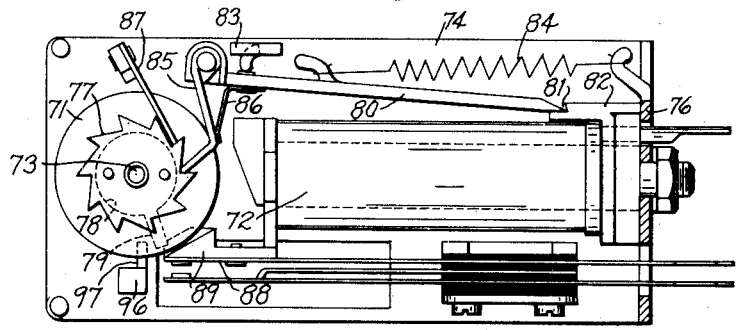

Fig. 8 is a side elevation of one denominational mechanism of the product accumulator.

Fig. 9 is a side elevation of an interrupter relay used during a product registering operation.

Figure 10:
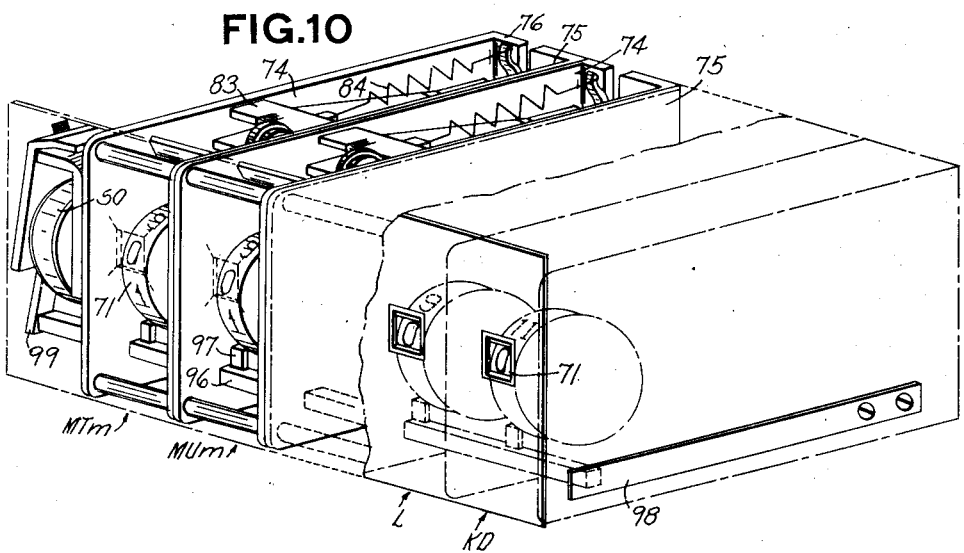

Fig. 10 is an isometric view showing the multiplier indicating means and part of the product accumulator.

Fig. 11 is a side elevation of a rotary control switching means used to control the entry of values in the product accumulator.

Fig. 12 is a diagram showing the arrangement of Figs. 1 to 5 inclusive and 6A and 6F inclusive to form a complete circuit diagram.

Figs. 13A and 13B together constitute a sequence of operation or time chart showing the order in which various relays are energized and released during the performance of a typical problem of multiplication.

*General description*

The machine of the instant invention is shown as being capable of performing multiplications involving factors up to 99×£9 19s. 11d.; however, it will be obvious as the description proceeds that this capacity can be enlarged without departing from the substance of the invention.

Digit keys are provided for introducing the factors into the machine, and a separate relay is provided for each key, which relays are selectively energized under control of the keys and serve to store the factors.

Associated with the storage relays for the multiplier are a group of halving relays which are energized from the multiplier storage relays and set up circuits which are later effective to enter into these storage relays half the amount previously set up therein. Similarly, a group of doubling relays are associated with the storage relays for the multiplicand and operate to set up in the storage relays twice the amount previously set up therein. Overflow denominational groups of storage relays and doubling relays are provided to accommodate the increased value which results from the successive doubling operations.

A product accumulator is provided to add the terms of the multiplicand series which correspond to odd value terms of the multiplier series.

Multiplier indicating means are provided to indicate the value of the multiplier set up by the keyboard.

Circuits extend from the storage relays to rotary control switching means which control the entry of values in said multiplier indicating means and in said product accumulator.

A group of sequentially operable relays operate in a cycle to cause a halving and doubling operation, and these cycles continue one after another to cause successive halving and doubling operations to form the series of terms.

Means are provided to signal when the term based on the multiplier is odd, and whenever this signal occurs, the initiation of another cycle of operation of the group of relays is delayed and an operation of the rotary control switching means and the product accumulator is brought about to enter the term standing on the multiplicand storage relays into the product accumulator. After the term has been entered into the product accumulator, the cyclic operation of the group fo relays is resumed to cause further halving and doubling operations to take place.

When the multiplier value has been reduced to zero by successive halving operations, means are operated to terminate the multiplying operation, to release all energized storing relays and to restore all the parts of the multiplying means to unoperated position except the product accumulator.

Resetting means is provided to reset the product accumulator to zero, when desired, to prepare the machine for another multiplying operation.

In the detailed description of the machine which follows, the various denominations will be indicated as follows: In the multiplier, the tens digit will be indicated as "Tm" and the units digit will be indicated as "Um," and in the multiplicand and in the product, the hundreds, tens, and units of pounds will be indicated as "P'," "N'," and "M," respectively, the tens and units of shillings as "H" and "L," respectively, and the pence as "KD."

Detailed description

A brief detailed description of the elements comprised in the machine will be given, so that, with an understanding of these elements and their operation, the operation of the machine as a whole will be more readily understood.

Figure 6B:
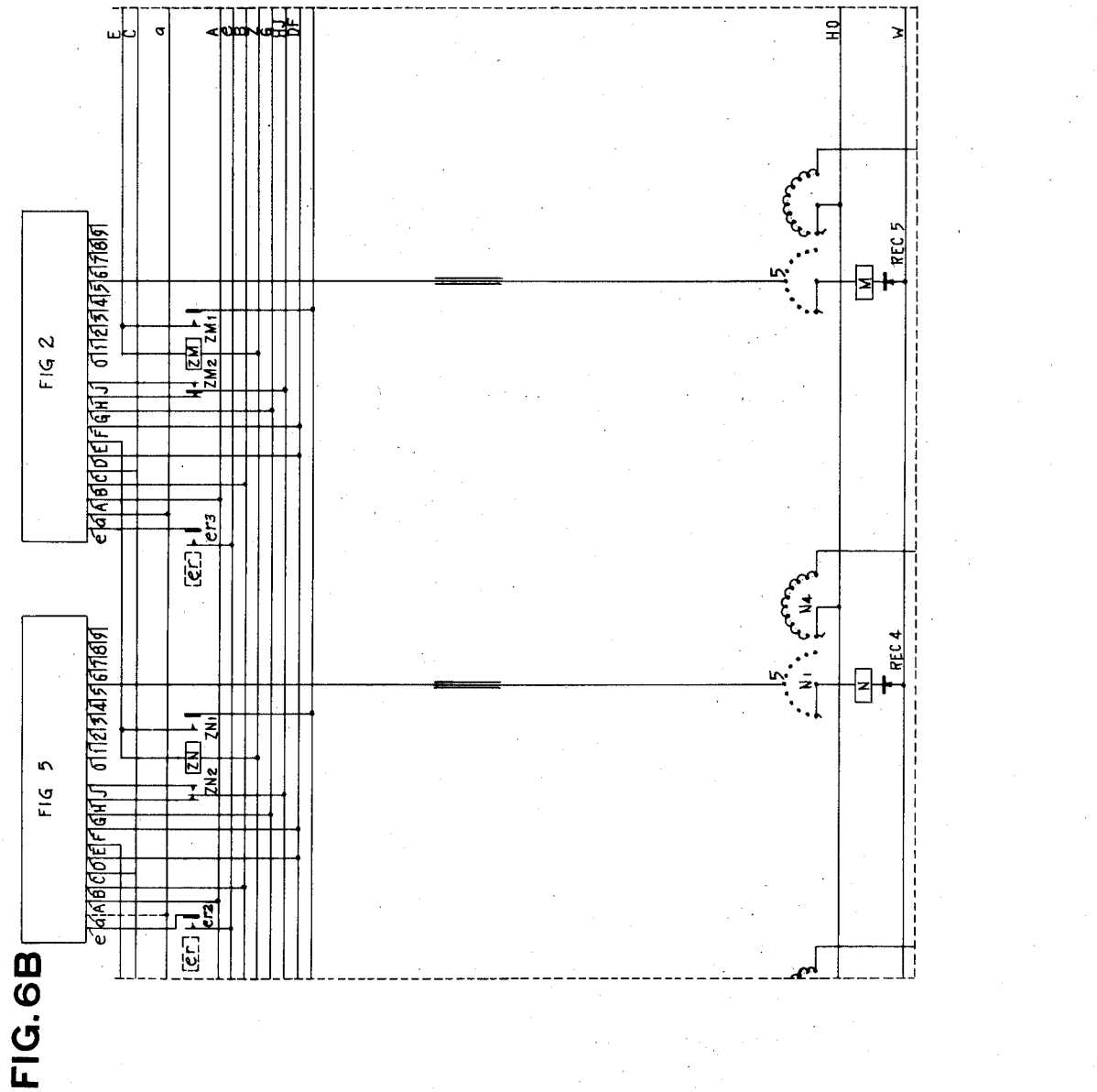
Figure 6C:
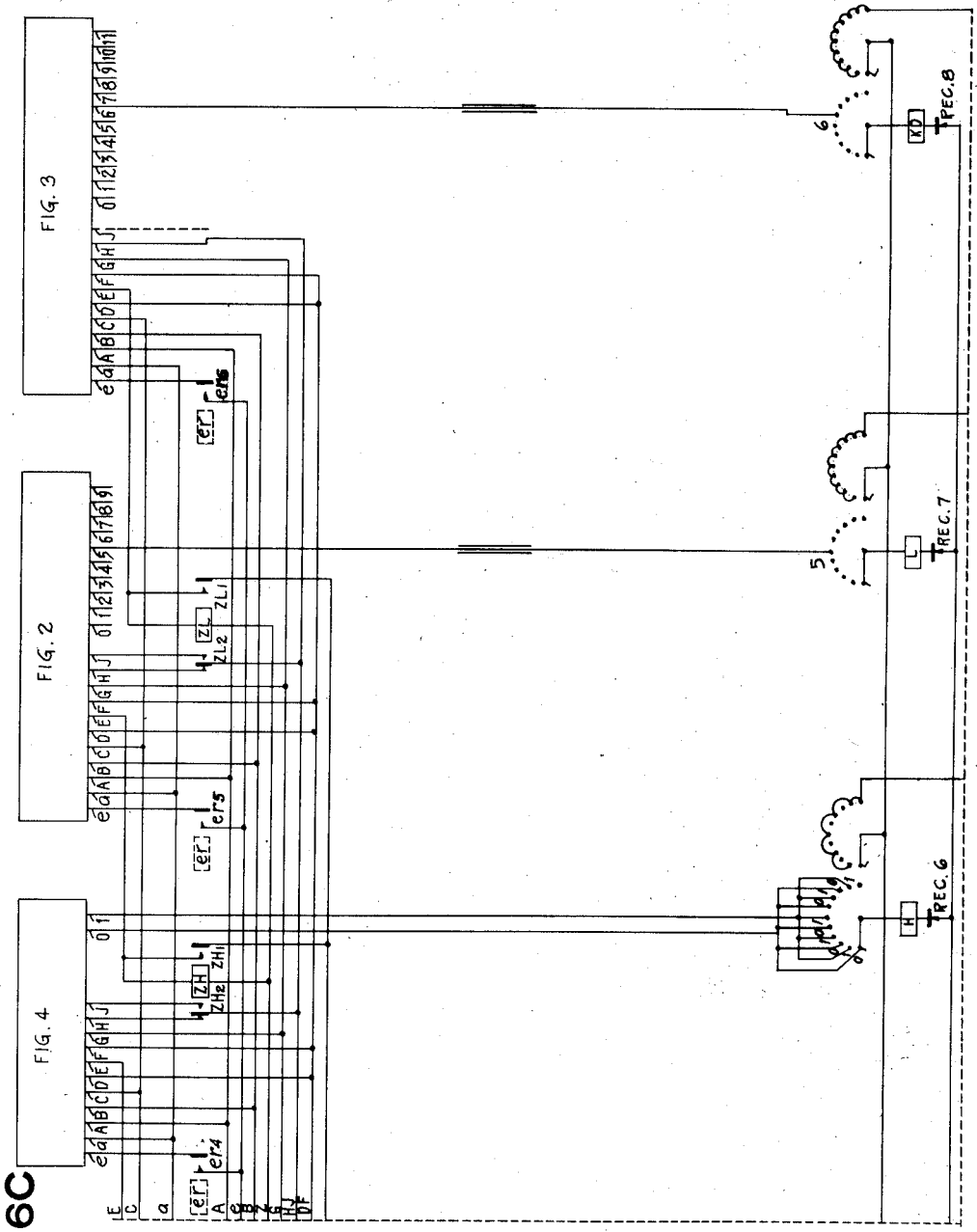

The complete machine requires the circuits of the various figures to be combined and in some instances duplicated, as shown in Fig. 12. However, to avoid unnecessary repetition in the showing of the halving and doubling circuits contained in Figs. 1 to 5 inclusive, these circuits are not shown again in connection with Figs. 6A to 6F inclusive. Each of the blocks designated "Fig. 1," "Fig. 2," etc., shown in Figs. 6A, 6B, and 6C represents the circuits shown in the respective figures, and reference may be had to Figs. 1 to 5 inclusive for details of these circuits.

Keyboard

The machine, as explained above, has a capacity to perform multiplications involving factors up to 99×£9 19s. 11d. Banks of amount keys 61 are provided for each denomination of both factors to enable the digits of the factors to be entered into storage relays, where they are retained to be used in the computation. The amount keys 61 (Fig. 7) are not retained in depressed position throughout a multiplying operation, but are restored to undepressed position as soon as the operator has released the keys after setting up the factors. This operation of the keys is necessary because storage relays are also energized from the halving and doubling means, and this would not be possible if the keys were held depressed.

The amount keys for the multiplier and the multiplicand are similar in construction and operation and differ only in that the multiplier keys close one contact while the multiplicand keys are used to close a pair of contacts. The function of these contacts will be explained more fully later, when the halving means and the doubling means are described.

The key banks are made up of keys 61, illustrated in Fig. 7. The key stem 62 is mounted for limited vertical sliding movement in a supporting frame 63 and is constantly urged upward by a helical spring 64. A contact-closing member 65, made of insulating material, engages movable blades 66 and 67 of the contacts and shifts the movable blades 66 and 67 into engagement with fixed blades 68 and 69 to close the contacts. The blades 66, 67, 68, and 69 are carried by the supporting frame 63 and are insulated from the frame and from one another. The multiplier keys utilize only one of the contacts, as it is necessary to close only one circuit by the multiplier key.

Various control keys, constructed similarly to the amount keys, are provided to control different operations. The functions of these keys will be explained when the operation of the machine as a whole is considered in connection with the circuit diagrams shown in Figs. 1 to 5 and 6A to 6D inclusive.

Product accumulator

A product accumulator is provided, in which the multiplicand and the various multiples of the multiplicand are accumulated to form a product.

The accumulator (Figs. 8 and 10) is composed of a plurality of similar denominational mechanisms, one for each possible denominational order of the product according to the capacity of the machine.

Each denominational mechanism of the accumulator (Fig. 8) comprises a numeral wheel 71 and an actuating magnet 72 therefor. The numeral wheel 71 is rotatably mounted on a shaft 73 journaled in the sides 74 and 75 of a U-shaped frame member 76 and has fastened thereto a ratchet 77 and a plate 78 formed with a tooth 79, which tooth is used as a control means in resetting and tens transfer operations.

The actuating magnet 72 is fastened to the base of the frame member 76 and has associated therewith an armature 80, which is pivoted at one end in a notch 81 in a plate 82 fastened to the frame member 76 and is urged clockwise about its pivot and into engagement with a stop member 83 by means of a spring 84 fastened to the armature 80 and to the frame member 76. A pawl 85 is pivotally carried by the other end of the armature 80, and this pawl is urged by a spring 86 into engagement with the ratchet 77 fastened to the numeral wheel 71. Whenever an electrical impulse is sent to the actuating magnet 72, it is energized and attracts the armature 80 and causes the armature 80 to rotate counterclockwise about its pivot, and this movement of the armature causes the pawl 85 to operate the ratchet wheel 77 and move the numeral wheel 71 one step. A resilient member 87 carried by the frame member 76 engages the ratchet 77 to prevent backward movement of the numeral wheel 71.

Also carried by the frame member 76 is a transfer control contact, one member 88 of which carries a projecting piece 89 engageable by the transfer control tooth 79 to close the contact whenever a tens transfer is to occur.

The mechanism shown in Fig. 8 is used in the denominational orders for the hundreds, tens, and units of pounds, and also for the units of shillings. In each of these orders, the numeral wheel is operated to make a complete rotation in ten steps and has the figures 0 to 9 inclusive thereon. The associated transfer control tooth 79 operates the transfer control contacts as the numeral wheel moves from its 9 to its 0 position.

The denominational mechanism for the tens of shillings denomination is similar to the one shown in Fig. 8, but, while the numeral wheel in this order is operated in ten steps to make one complete rotation, it has only the figures 0 and 1 alternating thereon. The plate connected to the numeral wheel is formed with five transfer control teeth, which close the transfer control contacts whenever the numeral wheel passes from 1 to 0.

In the pence denominational order, the mechanism is similar to that for the other orders, but the numeral wheel has thereon the numerals from 0 to 11 (Fig. 10), and the operation of the pawl and the ratchet is slightly modified to give the numeral wheel a movement of one-twelfth of a rotation each time the actuating magnet is energized. In this order, one transfer control tooth is provided to close the transfer control contacts as the numeral wheel passes from 11 to 0.

Means is provided in the product accumulator for stopping the accumulator wheels in zero position during an operation in which the accumulator is reset to zero. This means includes a bar 96 (Figs. 6D, 6E, 6F, and 10), which extends across all the denominations of the accumulator and is shiftable from an ineffective position to an effective position during resetting operations. The bar 96 has projections 97 thereon, one for each denominational order, and is engaged by a spring 98, which normally urges the bar 96 to the left, as viewed in Fig. 10, to keep the projections 97 on the bar 96 out of the path of the teeth 79 fastened to the numeral wheels. A magnet SO has an armature 99 connected to the bar 96, and, in resetting operations, the magnet SO is energized and attracts its armature 99, which shifts the bar 96 to the right to move the projections 97 into the path of the teeth 79. In a manner to be explained later herein, the actuating magnets for the numeral wheels have a series of impulses supplied thereto during a resetting operation and operate to step their numeral wheels around until the teeth 79 engage the projections 97 on the bar 96 to block further movement of the numeral wheels, at which time the numeral wheels will be in their zero position. After the movement of the numeral wheels has been blocked, the ratchets 77 will block the movement of the pawls 85 and their armatures 80, so that further energization of the actuating magnet will be ineffective to overcome the blocking of the armature, and the wheels will remain in zero position. At the end of a resetting operation, when the numeral wheels all stand in their zero positions, the magnet SO will be deenergized, as explained fully hereinafter, and the spring 98 will shift the bar 96 to ineffective position, so that the accumulator will be ready for another problem.

*Multiplier indicating means*

As shown in the circuit diagram (Fig. 6D) and in the isometric view of Fig. 10, means are provided at MTm and MUm for indicating the value of the multiplier set up in the multiplier storage relays. The indicating means comprise denominational mechanisms similar to these used in the product accumulator, differing therefrom only in that the transfer control contacts are omitted. As shown in Fig. 10, the bar 96 is also associated with these denominational mechanisms and has a projection 97 cooperable with the tooth fastened to each of the numeral wheels to stop these wheels in zero position in exactly the same manner as explained above for the product accumulator.

While the same bar 96 is shown associated with the multiplier indicating means and the product accumulator, it is obvious that a separate bar and operating magnet could be provided for the indicating means and the product accumulator, so that each may be reset independently of the other.

The manner in which the multiplier indicating means is controlled and operated will be explained hereinafter in connection with the circuit diagram, Figs. 1 to 5 and 6A to 6F inclusive.

*Interrupter relay*

An interrupter relay INT (Figs. 6D and 9) is provided to supply impulses to the actuating magnets for the product register and the multiplier indicating means. The relay INT includes a magnet having a frame 115, which carries a member 116, to which is pivoted an armature 117. The armature 117 has an extension 118 carrying a tip 119 of insulating material, which engages the middle or movable member of a pair of contacts INT₁ and INT₂. The movable member of the contacts is resilient and tends to close the switch INT₁ and cause the armature 117 to pivot clockwise until the extension 118 engages a stop 120 carried by the frame 115. When the magnet is energized, the armature 117 is rocked counter-clockwise, and the extension 118 will cause the contacts INT₁ to open and the contacts INT₂ to close. The counter-clockwise movement of the armature 117 is limited by an adjustable stop 121 carried thereby.

As will be explained more fully when the circuits are considered, the magnet of the INT relay is connected in series with the switch INT₁, and the actuating magnets 72 for the product accumulator and the multiplier indicating means are connected in a circuit which extends over switch INT₂, so that, upon each energization of the interrupter relay, its armature will open the circuit to its magnet and will close the circuit to send an impulse to the actuating magnets 72. This will cause an intermittent operation of the interrupter relay INT and a series of impulses to be sent to the various actuating magnets 72.

*Rotary control—switching means*

The type of rotary switching means shown in Fig. 11 is well known, and only a brief description thereof is believed to be necessary. Fastened on a shaft 101 journaled in a supporting member 102 are a ratchet wheel 103 and a plurality of sets of wiper arms 104, the sets of wiper arms being insulated from one another and from the shaft 101. The supporting member 102 also carries an actuating means for rotating the shaft 101, and this actuating means comprises a stepping magnet 105 fastened to the supporting member 102 by means of a member 100, an armature 106 pivoted on said member 100, and an extension 107 on said armature, to which extension 107 is pivoted an actuating pawl 108 urged into engagement with the ratchet by a spring 109. A spring 110, fastened to the armature 106 and to the supporting member 102, urges the extension 107 of the armature 106 into contact with a stop 128 fastened to the supporting member 102. A resilient member 111, fastened to the supporting means, engages the ratchet wheel 103 to prevent reverse operation thereof.

Each time an impulse is sent to the stepping magnet 105, the armature 106 is rocked counterclockwise about its pivot, and the pawl 108 drives the ratchet wheel 103 to give the shaft 101 and the sets of wiper arms 104 connected thereto one step of rotation in a clockwise direction.

As the sets of wiper arms 104 rotate step by step, one arm of each set engages, in succession, the contacts 112 of a related set of contacts 113. The sets of contacts 113 are shown in Fig. 11 as extending over an arc of approximately 110 degrees and are carried by a member 114, which is fastened to the supporting member 102. With the sets of contacts extending over such an arc as this, the set of wiper arms provided for each set of contacts contains three wiper arms 104, which are so located on the shaft that, when one wiper arm moves from the last contact of the set, the next wiper arm engages the first contact of the same set.

It is obvious that the number of contacts in each set of contacts may be varied, with an accompanying change in the extent of movement given to the shaft 101 in each operation thereof to enable the wiper arms to rest on a contact after each operation of the shaft.

In the circuit diagram, the sets of contacts and wiper arms are shown diagrammatically, with the sets of contacts extending over approximately 180 degrees and only one wiper arm associated with each set of contacts; however, in the actual construction of the sets of contacts and wiper arms, other arrangements may be used, as, for example, the one shown in Fig. 11.

Multiplier storing means and halving means

The storing means and the halving means are similar for each denominational order of the multiplier, so that the description of one order will serve for all orders. The storing relays for the multiplier are shown in Fig. 1, where they are referred to as the aA group. Ten relays having digit values 0 to 9 are provided in this group, and each relay is connected to a contact which is closable by a key of corresponding digit value, so that, when the key is depressed in setting up the multiplier, it completes a circuit from the line a through the winding of its related aA relay to the line A.

When the even-numbered storing relays 0, 2, 4, 6, and 8 are energized, each closes two contacts, one marked "1," which completes a circuit from the line B through the relay to line A and serves to retain the relay energized after the key is released, and the other marked "2," which completes a circuit from line C, through the halving relay corresponding to the storage relay, to line F.

In addition to closing contacts similar to the above-noted contacts, the odd-value relays close a third contact, marked "3," which connects the line D to the line E. The closure of these contacts marked "3" in the units denominational order of the multiplier is used to signal that the multiplier value is odd. In the tens denomination order, the closure of these contacts signals to the units order that a borrow is to be made in the next halving operation. The nature of the signal given by these contacts will be explained more fully when the operation of the machine as a whole is considered. To identify the contacts closed by the aA group of relays, the relay value will precede the letters aA, and the contact number will follow, as 0aA1 for the "1" contact of the zero relay.

The halving means comprises five relays, marked 0/5, 1/6, 2/7, 3/8, and 4/9, which are referred to generally as the half transfer group. Relay 0/5 is energized from contacts 0aA2 and 1aA2; relay 1/6 from contacts 2aA2 and 3aA2; relay 2/7 from contacts 4aA2 and 5aA2; relay 3/8 from 6aA2 and 7aA2; and relay 4/9 from 8aA2 and 9aA2.

Each of the halving relays closes three contacts, one, marked "1," which connects the line G over the winding of the relay to the line F to provide a holding circuit for the halving relays; the second, marked "2," connects the line H to line A over the winding of the storing relay corresponding to the first digit of the two used to identify the halving relay; and the third contact, marked "3," connects the line J to the line A over the winding of the storage relay corresponding to the second digit of the two used to identify the halving relay. These contacts will be indicated as 0/1—1, 0/1—2, and 0/1—3 in tracing circuits.

During the operation of the machine, potential is applied to the various lines marked a, A, B, C, D, E, F, G, H, and J at proper times, in a manner to be explained more fully later herein, to cause the storing and halving operations to take place.

It is believed that an explanation of a halving operation using definite values will make the understanding of the operation more clear.

Upon depression of the key 61 having the digit value 3 in the units denominational order, the contact 66, 68 is closed thereby to connect the line a to the line A over the winding of relay 3aA to energize this relay. Contact 3aA1 closes the holding circuit from line B over the winding of the relay to line A; contact 3aA2 prepares a circuit from line C over the winding of the halving relay 1/6 to line F; and contact 3aA3 signals that the amount is odd.

At the proper time, potential is applied to line C, which causes the relay 1/6 to be energized to close its contact 1/6—1 and complete its holding circuit from line G to line F; to close its contact 1/6—2 to connect the line H to the storage relay 1aA; and to close its contact 1/6—3 to connect the line J to the storage relay 6aA, but the lines H and J have no potential applied to them at this time.

After the halving relay has been energized, sequence relays, to be described later, momentarily break the holding circuit for the storage relays, and relay 3aA is released, and, at the same time, the potential is removed from line C.

After the storage relays have been cleared, potential is applied to line H if no borrow has been indicated from the tens order and to line J if such a borrow has been indicated. If potential is applied to line H, the storage relay 1aA (which is half the original value to the next lower integer) is energized and is held by its holding circuit, which has been restored. If potential is applied to line J, storage relay 6aA (which is half the original value to the next lower integer after taking the borrow into account, or half of 13) is energized and remains energized over its holding circuit.

When the storage relay has been energized, the sequence relays remove potential from the H or J line and remove the holding circuit for the halving relay 1/6 to release the halving relay. With the release of the halving relay, the halving operation has been completed.

Upon the completion of one operation of halving the multiplier, the same sequence is repeated to again divide the amount in the storage devices by two.

As soon as the first halving operation begins, potential is removed from line a to prevent the keys from controlling the storage relays after a multiplying operation has begun.

A group of circuits indicated at 0 to 9 in Fig. 1 extend from the storage relays and have potential applied thereto whenever the relay having the same value is energized. These circuits are used for controlling the multiplier indicating means.

Multiplicand storing means and doubling means

The multiplicand storing means and doubling means for the various denominational orders are shown in Figs. 2, 3, 4, and 5.

In the multiplicand denominations, no zero amount keys are provided, the zero value being entered automatically for this factor. As explained earlier, the multiplicand keys close two contacts 66, 68, and 67, 69. The upper one of these contacts, 66, 68 as shown in Fig. 2, is used to cause the energization of the related storing relay, and the lower one 67, 69 is used to cause the energization of a winding of the zero relay for a purpose to be explained later.

Fig. 2 shows the arrangement which is used in the units of pounds and units of shillings denominational orders.

The storing relays of the $aA$ group for this order comprise relays 1 to 9, corresponding to the keys 1 to 9, and a zero relay. The storing relays 1 to 9 have a single winding and are connected to the upper contacts 66, 68 closed by the keys, so that, when any of the keys is depressed, its contact is closed to connect the line $a$ to the line A over the winding of the related storing relay to cause it to be energized in the same manner as a multiplier storing relay.

Each of the storing relays 1 to 4 closes a pair of contacts marked "1" and "2." The contact marked "1" closes a holding circuit for the relay by connecting the line B to the line A over the winding of the relay, and the contact marked "2" prepares an energizing circuit to the appropriate doubling relay by connecting the line C to the doubling relay.

The storing relays 5 to 9 close a third contact marked "3" in addition to contacts marked "1" and "2" as noted above. These contacts marked "3" are used to connect the line D to the line E to signal to the next higher denominational order that a tens carry must be made therein, and are provided in these relays because any of the values 5 to 9, when doubled, contain a tens value component.

Since there are no zero keys, the zero relays are energized automatically before the amount keys are operated. At the beginning of an operation, a start key is operated to prepare the machine for the reception of the factors, and the operation of this key causes an impulse to be sent to line $e$, which is connected over the left-hand winding of the zero relay, as shown in Fig. 2, to the line A. The impulse causes the zero relay to become energized and close three contacts. The contact marked "2" connects the line B to the line A over the left-hand winding of the zero relay to form a holding circuit for the left-hand winding. The contact marked "3" prepares an energizing circuit from line C to a related one of the doubling relays.

The contact marked "1" in the zero storing relay connects the right-hand winding of the zero relay to the second contact closable by the amount keys. If any key is operated, it not only causes the energization of a storing relay of like value, but also causes the energization of the right-hand winding of the zero relay over a circuit connecting the line $a$ to the line A.

The left-hand and right-hand windings of the zero relays are wound to produce opposing fields, so that, after the left-hand winding has been energized to close the contacts, the energization of the right-hand winding will neutralize this field and cause the contacts to be opened. The opening of the contact marked "1" will disconnect the right-hand winding from the contact closed by the key, and the opening of the contact marked "2" will break the holding circuit for the left-hand winding, so that both windings of the zero relay will become deenergized.

The right-hand winding of the zero relay, therefore, provides a means for deenergizing the relay and is operated in such a manner that it cannot cause an initial energization thereof.

It is seen that, at the beginning of any multiplying operations, the zero relay is energized, but is released upon subsequent operation of any numeral key.

The line $e$ is used to energize the zero relays only before the first doubling operation. If the zero relay is to be energized as a result of a doubling operation, its left-hand winding is energized from a closed contact in one of the doubling relays in the usual manner.

The doubling means shown in Fig. 2 comprises five relays marked 0/1, 2/3, 4/5, 6/7, and 8/9, which relays are referred to generally as the double transfer group.

The doubling relays are energized over contacts closed in the storage relays as follows: Relay 0/1 is energized from the line C over contacts closed in either the 0 or the 5 storage relays; relay 2/3 is energized from the line C over contacts closed in either the 1 or the 6 storage relays; relay 4/5 is energized from the line C over contacts closed in either the 2 or the 7 storage relays; relay 6/7 is energized from line C over closed contacts in either the 3 or the 8 storage relays; and relay 8/9 is energized from line C over closed contacts in either the 4 or the 9 storage relays.

Each of the doubling relays closes three contacts, one contact closing a holding circuit for the relay, a second contact connecting the line H to the line A over the winding of the storing relay corresponding to the first digit of the two digits used to identify the doubling relay, and the third contact connecting the line J to the line A over the winding of the storing relay corresponding to the second digit of the two digits used to identify the doubling relay.

The lines marked $a$ A, B, C, D, E, F, G, H, and J, associated with the multiplicand storing means and doubling means, have potential applied thereto at the same time potential is applied to lines having the same designation in the multiplier storing means and having means, so that a doubling operation occurs simultaneously with a halving operation.

The following example will make the doubling operation more clear. If the storing relay 4$a$A is energized, it will cause the doubling relay 8/9 to be energized when potential is applied to line C. The energization of doubling relay 8/9 connects line H to storing relay 8$a$A and connects line J to storing relay 9$a$A, but lines H and J have no potential applied thereto at this time.

The storing relay 4$a$A is released, and the energizing circuit to relay 8/9 is broken, but relay 8/9 is held by a holding circuit at this time. After the storing relay 4$a$A has been released, potential is applied to line H if no transfer has been signalled from the next lower order, and the storing relay 8$a$A (which is twice the original value) will be energized and held by its holding circuit, which has been restored. If a transfer has been signalled from the next lower order, potential will be applied to line J, and the storing relay 9$a$A (which is twice the original value plus the unit carried from the lower order) will be energized and remain energized over its holding circuit. After the result of the doubling operation has been entered in the storing relays, potential is removed from the line H or J, and the holding circuit for the doubling relay is opened to release the doubling relay, thus completing the doubling operation.

The repetition of this sequence of operation will cause the result of the previous doubling operation to be doubled, and these doubling operations will continue as often as there are halving operations in the multiplier section.

Circuits extend from the storing relays to the rotary control switching means to control the entry of amounts in the product accumulator, as will be explained later herein.

Figure 3:
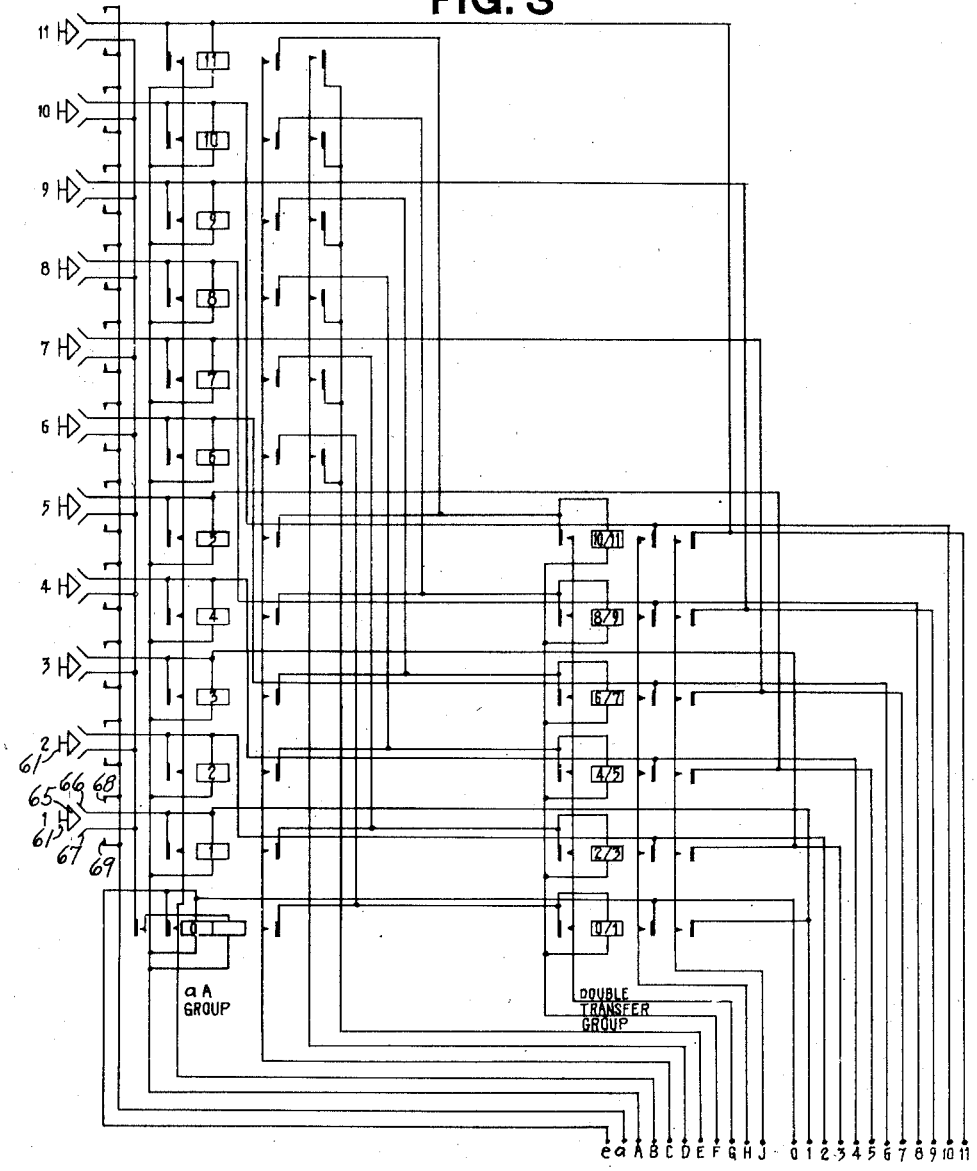
Fig. 3 shows the storing means and the doubling means for the pence denomination of the multiplicand.

The storing relays and doubling means for the pence denomination of the multiplicand are shown in Fig. 3. These relays and doubling means are controlled in exactly the same manner as those in the decimal denomination explained above and operate to enter into the storing means in each doubling operation twice the amount previously stored therein. Due to the fact that this denomination requires eleven keys, numbered 1 to 11, twelve relays are provided in the aA group and six are provided in the double transfer group. Of the relays in the aA group, those relays having assigned thereto values from 6 to 11 close contacts to signal to the units of shillings that a transfer is to take place.

Figure 4:
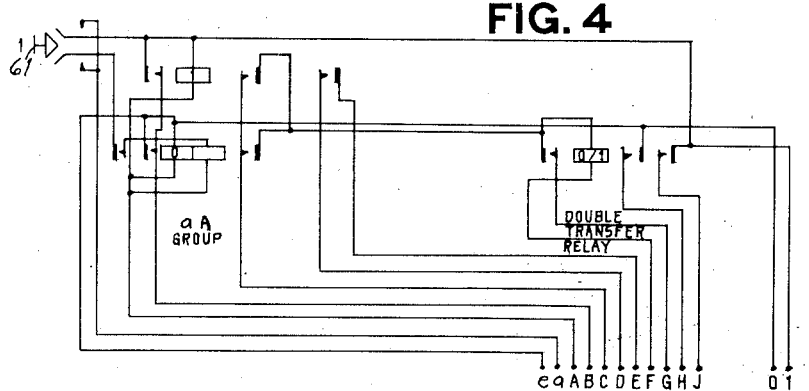
Fig. 4 shows the storing means and the doubling means for the tens of shillings denomination of the multiplicand.

In the tens of shillings denomination shown in Fig. 4, the storing relays and doubling means are controlled as in the other orders, but, inasmuch as there is only one key in this order, only two storing relays and one doubling relay are provided. The storing relay having the value "one" closes contacts to signal a transfer to the units of pounds order in a doubling operation.

Overflow denominations of storing means and doubling means are provided in the tens and hundreds of pounds denominations to accommodate the increase in the size of the multiplicand term as doubling operations progress. Fig. 5 shows one of these denominations, and, as the storing means and doubling means are the same in both denominations, only one will be described.

The aA group of relays contain ten storing relays, marked from 0 to 9. These relays function similarly to those in any other decimal group, as shown in Fig. 2, but, since there are no keys for controlling this order, some slight changes have been made. The only entry of digit values in the overflow denomination comes as a result of a tens transfer from the lower order, so that the zero relay in this denomination has only one winding, which is the equivalent of the left-hand winding of the zero relays in the other denominations and is energized by the impulse on the line e prior to the first doubling operation.

The double transfer group of this denomination is exactly the same as those in the other decimal denominations and operates to set up in the storing relays twice the amount previously set up therein. Since the only entry in this denomination is by a transfer of a unit from the next lower order after the initial energization of the zero relay, the double transfer relay 0/1 will repeatedly energize the zero relay in the successive doubling operations until a transfer occurs.

In any of the multiplicand denominations, if any single digit is doubled, the carry-over to the next higher order can never exceed unity, and the units digit of the doubling can never exceed 8, so that there will never be an occasion when a carry on a carry will occur in a doubling operation.

*Means for controlling the component elements of the machine to perform a multiplication*

With an understanding of the various component elements making up the machine, a description of the control means for coordinating the various elements to enable multiplication to be performed will now be described.

In this explanation, Figs. 1 to 5 and 6A to 6F inclusive are to be considered together, according to the arrangement shown in Fig. 12.

To prepare the machine for operation, a main switch (Fig. 6D) is closed to apply positive and negative battery to the leads 122 and 123, respectively. After potential has been applied to the leads 122 and 123, the start key is momentarily depressed and will close a circuit from — battery, over line 123 over a contact closed by the start key, contact ZO5, which is closed, the winding of the S relay, contact BB3, which is closed, and over the lamp SL and the resistance r1 in parallel to line 122 and then to + battery. Resistance r1 is used to control the voltage applied to the lamp SL. The S relay is energized and closes a holding circuit from negative battery, over contact S1, which is operated, contact ZO5, the winding of S relay, contact BB3, and over the lamp SL and resistance r1 in parallel to + battery. Relay S closes a contact S2 to complete a circuit from — battery, over line 123, contact S2, which is now closed, er relay, contact BR1, which is now closed, over line 122, to + battery. This energizes the er relay to close circuits to provide an impulse to the left-hand windings of the zero storing relays in the multiplicand denominations.

A typical circuit for one of the zero relays is as follows: from + battery over contact er1, which is now operated, the e line (Fig. 5), the left-hand winding of the zero relay, the A line, and over contact R1, which is closed at this time, to — battery at line 123. Similar circuits extend over contacts er2, er3, er4, er5, and er6 to cause their related zero relays to be energized. The S relay also closes a contact S3 to connect the a line to + battery on line 122. The S relay also closes contact S4 to apply positive potential to the B lines, the circuit extending from the + battery on line 122, over the winding of the relay BR to the line B.

At this time, all the zero relays will have been energized and will have closed a holding circuit from the line B to the line A, as explained above, and, with potential applied to line B, this circuit will now be effective. The relay BR will be energized and will operate its contact BR1 to break the circuit to the er relay, which removes potential from the lines e in each denominational order of the multiplicand, but the zero relays remain energized over their holding circuits as traced above.

The machine is now ready to receive the digits of the multiplier and the multiplicand. Inasmuch as the entry of digits in the various denominations of the multiplicand and the multiplier are similar, circuits explaining a typical entry in a multiplier denomination and in a multiplicand denomination will be representative of entries in all denominations, so that it is not believed necessary to repeat the description of the entry of digits in each denomination.

Typical entries in one of the multiplier denominations will now be explained. The entry of an even digit, as 4, will be considered.

The digit key 61 having the value "4" (Fig. 1) is depressed. This key has no locking means and will be released as soon as the operator removes pressure from the key. When the key is depressed, it will close a circuit from + battery over closed contact S3, the a line, contact 66, 68 closed by key 4 (Fig. 1), over the winding of the storing relay 4aA, to the A line, and over contact R1, which is closed, to line 123 and − battery. This causes the storing relay 4aA to be energized. When the relay 4aA is energized, it closes its contact 4aA1 to close a circuit from + over the winding of the BR relay, contact S4, which is closed, the B line, contact 4aA1, the winding of relay 4aA, and over A line to contact R1, which is closed, to − battery. This circuit causes the relay 4aA to be maintained energized as long as potential remains on line B. Relay 4aA also closes a contact 4aA2 to connect the line C to its related half transfer relay 2/7. However, potential has not been applied to the line C at this time, so that the half transfer relay is not energized.

When an odd-valued digit is entered into the multiplier denomination, a slightly different condition exists, as an odd-valued digit is required to exert a control either for borrowing or to indicate that the multiplier is an odd value, in the manner explained above. The circuits involved in the entry of an odd-valued digit—for instance, the digit 7—will be explained. The key 61 having the value of 7 is depressed and closes a circuit from + battery over contact S3, which is closed, the a line, the contact closed by the key 7, the winding of relay 7aA, the A line, and over contact R1, which is closed, to − battery. This energizes the storing relay 7aA, which closes its contact 7aA1 to complete a holding circuit similar to the one traced above, and also closes contact 7aA2 to prepare the circuit from the line C to its related half transfer relay 3/8 in a manner similar to the control exerted above in connection with the contact 4aA2. In addition to these contacts, relay 7aA also closes a contact 7aA3 to connect the line D with the line E, which connection of lines D and E is used to signal the conditions of borrowing and the odd value of the multiplier, as noted above.

Typical entries in the multiplicand denominational orders will now be explained.

Slightly different conditions exist when values which, if doubled, do not require transfer are used and when those which do require transfer, if doubled, are used. The entry in a multiplicand denomination of the digit 3, which does not involve a transfer, will now be explained. The digit key 3 is operated and closes the two contacts associated therewith. The upper contact shown in Fig 2, for example, closes a circuit from + battery over S3, which is now closed, the a line, the upper contact closed by the switch for the key having the value 3, over the winding of the relay 3aA, to the line A, and over contact R1, which is now closed, to − battery, and this circuit energizes the storing relay 3aA. At the same time, the lower contact 67, 69 closes a circuit from + battery over contact S3, which is closed, the a line, the lower contact, which is closed by the key 3, contact O1 for the zero relay, which contact has been closed by the energization of the left-hand winding of this relay, over the right-hand winding of the zero relay, to the line A, and thence over contact R1, which is now closed, to − battery. This energizes the right-hand winding of the zero relay, which neutralizes the effect of the energization of the left-hand winding, and causes the contacts, which were closed when the left-hand winding was energized, to be released. The release of the contacts causes both windings of the zero relay to become deenergized, and the relay remains deenergized, as explained above in connection with the description of the multiplicand storing means and doubling means.

Depression of the key 3, therefore, has caused the zero relay of this order to be released and the storing relay 3aA to be energized. The energization of the relay 3aA closes contacts 3aA1 to provide a holding circuit which extends from + battery over the winding of the BR relay, over contacts S4, which are closed, over the B line, contact 3aA1, which is closed, the winding of relay 3aA, the A line, contact R1, which is closed at this time, to − battery. Relay 3aA also closes a contact 3aA2 to prepare an energizing circuit for the double transfer relay 6/7 from the line C. However, as in the case above, the potential has not been applied to line C, so that the relay 6/7 is not energized at this time.

When an amount is entered in the multiplicand which will require a tens transfer when the amount is doubled, slightly different conditions exist. As an example, the entry of the digit 6 will be explained. The circuits involved in the entry of such a value will be traced. Upon depression of the key 61 having the value of 6, the upper contacts 66, 68 will be closed to complete a circuit similar to the one explained for the digit 3 to energize the storing relay 6aA, and the lower contacts 67, 69 will close a circuit to deenergize the zero relay. When the relay 6aA is operated, it will close its holding circuit over the contact 6aA1 and prepare an energizing circuit for its related double transfer relay over contact 6aA2 in a manner similar to that explained above in connection with relay 3aA. In addition to the above circuits, storing relay 6aA closes a contact 6aA3, which connects the line D with the line E. This additional connection is used to signal to the next higher denomination that a transfer is to occur.

The signal which is sent when the contacts in the aA relays connect the lines D and E consists in the energization of one of the relays ZA, ZO, ZP, ZN, ZM, ZH, and ZL (Figs. 6A, 6B, and 6C). Relay ZA is energized when the lines D and E of the tens multiplier denomination are connected, and shifts its contact ZA2 to transfer the application of potential from the line H in the units multiplier to the line J therein to take care of a borrow from the tens denominational order in a halving operation. The relay ZO is energized when the lines D and E in the units order of the multiplier are connected, and indicates that the multiplier value is odd.

The relays ZP, ZN, ZM, ZH, and ZL are associated with the denominations of the multiplicand and are energized when the lines D and E of a lower order have been connected to indicate a tens transfer to the next higher order. These relays, when energized, shift their contacts as ZP2 to transfer the application of potential from the lines H to the lines J to cause the tens carry to be effected in a doubling operation.

The relays as ZA are energized as soon as the lines D and E are connected when the relays aA are energized.

The relays ZA, ZP, ZN, ZM, ZH, and ZL close contacts which complete holding circuits for these relays. A typical one of these circuits extends from − battery, over contacts K2, which are closed at this time, over contacts ZA1, which are closed when the relay ZA is energized, over the winding of the relay ZA, to line Z, which is connected to + battery.

It will be clear, from the above-explained typical circuits for entering the multiplicand and multiplier values, that, upon the complete setting of the multiplier and the multiplicand by the keys, the associated storing relays of the aA groups will be energized, circuits will be prepared to the related half transfer and double transfer relays, and zero relays will be energized in the multiplicand banks in which no key has been depressed, and, in addition thereto, the signalling relays as ZA, etc., will have been energized.

When all the digits of the multiplier and the multiplicand have been entered into the storing relays aA, the operating key OP (Fig. 6A) is depressed to initiate the multiplication of these factors. The operating key OP closes a circuit from — battery over contacts closed by the operating key OP, over the winding of the relay OPR, contacts SO1, which are closed at this time, and then over the lamp OPL and resistance r2 in parallel to positive battery. This causes the relay OPR to be energized, which relay, when energized, closes its holding circuit from — battery, over contact OPR1, which is closed, over the winding of relay OPR, over the contact SO1, which is closed at this time, and thence over the lamp OPL and resistance r2 in parallel to + battery.

The machine will now begin to perform the multiplication. There is a possibility of two modes of operation when the machine begins to operate, depending on whether or not the entered multiplier value is even or odd. If the multiplier value is even, the machine halves the multiplier and doubles the multiplicand at once, but if, on the other hand, the multiplier is odd, the halving and doubling operations will be held up until after the multiplicand has been entered into the product accumulator.

The condition when the multiplier is even and the halving and doubling operation begins immediately will be considered first.

The relay OPR closes a contact OPR2 to complete a circuit from + battery, over closed contact OPR2, over the winding of the relay BB, over contact GR1, which is closed, B line, over the holding circuit contacts in the aA relays in the multiplier and the multiplicand groups, to the A line, and over contacts R1, which are closed, to the — battery. This circuit provides a second connection for the line B to hold the aA relays from a source other than the circuit over contact S4. This circuit also causes the relay BB to be energized to start the sequence of operations necessary to cause halving and doubling to take place.

Relay BB opens contact BB3 to break the holding circuit for the relay S, described above. This releases the relay S, which breaks, at S4, the circuit to the BR relay and breaks, at S3, the circuit to the line a, which disables all the keys in the keyboard to prevent any accidental operation of the keys from causing the energization of storing relays and thus affecting the operations of doubling and halving during multiplying operations. The deenergization of the relay S also opens contact S2, and, as relay BR has been deenergized, contact BR1 is reclosed, but contact S2 breaks before contact BR1 can be reclosed, because the relay BR is of the type which is slow to deenergize, and this opening of contact S2 prevents the reclosing of the circuit to the relay er and the consequent reenergization of the zero relays in the multiplicand denomination.

Relay BB closes contact BB1 to complete a circuit from + battery, over closed contact OPR2, over closed contact BB1, over closed contact GR2, to the line C, and over contacts in the aA relays of the multiplier and the multiplicand denominations, one for each denomination, over the winding of the appropriate half transfer and double transfer relays, and then over the line F to — battery. The application of potential to the line C, therefore, completes the energization of the half transfer and double transfer relays.

Relay BB also closes contact BB2, and this contact connects positive potential to the line G over the following circuit:

From + battery, over closed contact OPR2, over closed contact BB2, the winding of relay GR, closed contact K1, to the line G. When the halving and doubling relays are energized, they close contacts which connect the line G over the windings of the halving and doubling relays to the line F, which is connected to — battery, to thereby provide holding circuits for the halving and doubling relays. The completion of this holding circuit for the halving and doubling relays causes the relay GR to be energized. Relay GR, when energized, opens the contact GR1 to break the circuit including the BB relay and remove potential from the line B, which releases the relay BB and all operated storing relays aA. Relay GR, when operated, operates its contact GR2 and breaks the circuit from + over BB1 and GR2 to the C line and removes the energizing circuit for the halving and doubling relays, but these relays are retained energized at this time by their holding circuits. Relay GR closes contact GR4 to close a circuit in parallel with BB2 and maintain the GR relay energized after contacts BB2 have been opened. Relay GR closes contact GR3 to close a circuit from + over closed contact OPR2, over closed contact GR3, the winding of relay HJR, over K1, to the line G. This circuit connects the relay HJR in parallel with the relay GR. The relay HJR is of the type which is slow to energize, and, when this circuit is completed and the relay HJR is energized, it closes the contacts HJR1, which connect the + battery, over closed contact OPR2, over closed contact HJR1, to the line HJ, which is connected to the line H or J in each denominational order, depending upon whether or not the signalling relays ZA, ZP, etc., have been energized. The circuit continues from the H or the J lines over the closed contacts in the halving and doubling relays to energize the storing relays corresponding to half or double the values originally set up in the storing relays. Relay HJR also closes a contact HJR2, which completes a circuit from + battery over closed contact OPR2, the winding of relay K, over closed contact HJR2, to the line B; this restores the holding circuits for the relays aA until the contact GR1 is again closed to apply potential to the line B from that source.

Relay K is energized and opens contact K1 to release the relays GR and HJR and to remove potential from the line G, which releases the holding circuit for the halving and doubling relays.

Relay K also operates contacts K2 to break the holding circuit to the relays ZA, ZP, etc., which are held over this contact.

Contact GR4, on opening, removes the holding circuit for relay GR. Contact GR3 opens the circuit to relay HJR (already broken by the operation of contact K1). Contact GR1, being closed upon the deenergization of relay GR, completes the circuit which includes the BB relay, and the BB relay is reenergized. The release of relay HJR causes the contacts HJR1 to open to break the circuit to the H or the J lines which were used to energize the aA relays. The release of relay HJR also releases contacts HJR2 to break the circuit to relay K, which is slow to deenergize. Upon deenergization of relay K, contact K1 is reclosed and prepares the GR relay circuit.

The cycle of the sequence relays begins again when relay BB is energized, and, upon continuation of the cycle, the halving and doubling operation will be repeated. Thus it is seen that the multiplier is halved and the multiplicand is doubled immediately without the entry of the multiplicand into the product accumulator if the value of the multiplier is even.

When the multiplier which is entered by the keyboard is odd—that is, when the units denomination has a value 1, 3, 5, 7, or 9—the signalling circuit, which extends from — battery, over the D line of the units multiplier denomination, over the closed contacts 3 of one of the odd value storing relays aA, to the E line, over the winding of the ZO relay, over the contacts OPR2, is closed to + battery. This causes the ZO relay to be energized. Relay ZO causes the start relay S to be deenergized, prevents the cycling of the sequence relays, and initiates an entry of the multiplicand into the product accumulator. Contact ZO5 is opened to release the start relay S. Relay ZO closes contact ZO1, which immediately short-circuits the BB relay and causes this relay to remain unenergized.

When relay BB thus remains unenergized, the sequence of operations necessary for a halving and doubling operation is delayed.

When the relay ZO is energized, it closes its contact ZO2 to complete a circuit to the interrupter relay INT as follows: from + battery, over the winding of the magnet INT, over closed contacts ZO2, over interrupter contacts INT1, to — battery. The interrupter contacts INT1 are bridged by a resistance r3 and condenser in series to reduce sparking when they are operated. The closure of this circuit causes the interrupter relay INT to be energized.

The energization of the interrupter relay causes contacts INT1 to open, as explained earlier herein, to deenergize the magnet and allow the contacts INT1 to reclose, which causes the intermittent operation of the relay. Contacts INT2 are closed by the interrupter relay each time the relay is energized, and provide a series of impulses which are used to drive the rotary control-switching means and the accumulator wheels.

Relay ZO closes contact ZO3 to connect the contacts INT2 to the stepping magnets 105 for the rotary control-switch means and the actuationg magnets 72 for the product accumulator.

The circuit for the stepping magnet 105SP extends from — battery, over the intermittently closed contacts INT2, the winding of relay Q, over contact ZO3, which is now closed, to the line MA—, over contact P1"x", now closed, over the winding of the stepping magnet 105SP, to the line MA+, over the contact SO5, which is closed, over contact RE1, now closed and associated with the key RE, and over contact ER3, which is unoperated, to + battery. The Q relay is quick to energize and slow to release and will remain energized during the operation of the INT relay.

Contacts Q1 are opened by the energization of relay Q and remain open as long as the relay is energized. In an amount-entering operation which in initiated by the energization of signal relay ZO, the open condition of contacts Q1, during the operation of the INT relay, prevents the signal relay ZO from being short-circuited as long as the INT relay is operating; and, until the relay ZO is short-circuited, the recycling of the control relays is prevented by the short-circuit on relay BB, which is completed over contact ZO1 when relay ZO is energized. Accordingly, in any instance when the recycling of the control relays is delayed by the short-circuiting of relay BB by the circuit including contact ZO1, the relay Q is effective, through its contact Q1, to prevent the recycling of the control relays as long as impulses are being sent over contacts INT2 by the operation of the INT relay.

The other stepping magnets, 105SN, 105SM, 105SH, 105SL, and 105SKD, are connected in parallel between the lines MA— and MA+, over contacts as N1"x", which are similar to contacts P1"x" in the above circuit. These stepping magnets operate in unison with the stepping magnet 105SP. The circuit for the accumulator actuating magnet 72MP also extends from — battery, over the intermittently closed contacts INT2, the winding of Q relay, contact ZO3, and from this point it extends to line ME—, thence over contact P2, which is closed, the winding of the actuating magnet 72MP, to line ME+, over contact ER2, which is closed, over contact RE1, contact ER3, which is unoperated, to the + battery.

The other accumulator actuating magnets 72MN, 72MM, 72MH, 72ML, and 72MKD are connected in parallel between the lines ME— and ME+, over contacts as N3, which are similar to contacts P3 in the circuit traced for the magnet 72MP.

Since both the stepping magnets and the accumulator actuating magnets are connected to the contacts ZO3 and receive impulses from INT2, they will step in unison as the impulses are sent out by the contacts INT2.

The wipers of the rotary control-switch are operated step by step by their related stepping magnets and are used to control the disconnection of the stepping and actuating magnets from the circuit containing the INT2 contacts. The operation of the wiper arms in the various denominational orders is similar, so that an explanation of the control by the wiper P1 (Fig. 6A) will serve as an explanation of the operation of all the wiper arms.

As the stepping magnet 105SP operates, it drives the wiper arm from a normal or zero position over the contacts associated therewith until it encounters a contact which has potential applied thereto from an energized storing relay (in Fig. 6A, only the circuit for the digit 5 is shown, but it is obvious that each of the lines 0 to 9 is connected to the aA relays and to the set of contacts), in this instance, contact 5. When the wiper arm engages the contact 5, the following circuit is completed: from — battery, over contact ER4, which is closed, over the rectifier REC3 (a metallic rectifier is used at this point to prevent improper circuits from operating the relay P), over the winding of the P relay, the wiper arm P1, its associated contact 5, B line (which is connected by the aA relay No. 5), thence to contact GR1, which is now closed, contact ZO1, which is closed, OPR2, which is closed, to + battery. This energizes control relay P, and relay P breaks, at P1"x", the circuit to the stepping magnet 105SP and breaks, at P3, the circuit to the accumulator actuating magnet. This causes the stepping of the wiper arm and the rotation of the accumulator wheel to be terminated. In like manner, other control relays cause the stepping or actuation of the wiper arms and the accumulator wheels in other denominational orders to terminate the entry in the respective denominations. When all wiper arms find contacts connected to energized aA relays in each multiplicand denomination, all the accumulator wheels will cease to step and will register the amount stored in the multiplicand relays aA at this time.

Relay ZO also closed contact ZO4. This prepares a circuit for the energization of relay ER, but this circuit is open at the contacts P2 to KD2, which are connected in series. When the control relays P to KD are energized to terminate the entry of an amount in the product accumulator, they also close the contacts P2 and KD2, which, when all of these contacts are closed, complete the energizing circuit for the relay ER as follows: from — battery, over contact Y1 in its lower position, over the operated contacts P2, N2, M2, H2, L2, KD2, the winding of relay ER, closed contact ZO4, to + battery. When the relay ER is energized it closes contact ER1"x" to provide a holding circuit from — battery, over closed contact ER1"x", the winding of relay ER, closed contact ZO4, to + battery. The relay ER, when energized, also opens contact ER2 (Fig. 6D) to interrupt the circuit to the actuating magnets of the accumulator to prevent further actuation thereof, and opens contacts ER4 to deenergize the control relays P to KD. When the relays P to KD are deenergized, they reclose contacts P1"x" to KD1"x" and P3 to KD3, and open contacts P2 to KD2. The closure of contacts as P1"x" reprepares the stepping magnets for operation. The closure of the contacts as P3 reprepares the accumulator magnets for operation, but their circuits are broken at this time at contacts ER2 and ER3. Contact ER3 is shifted from its lower position to its upper position, when relay ER is energized, to close a circuit to cause the wiper arms to be set to their zero positions again. The circuits for the various orders are similar, so that only one will be traced, as follows: from + battery, over contact ER3 in its shifted position, over the wiper arm P4, contacts associated therewith (all contacts excepting zero are connected together), the line MA+, over the winding of the stepping magnet 105SP, closed contact P1"x", contact ZO3, the winding of the Q relay, contacts INT2, to — battery. Similar circuits are provided for other denominational orders. The contacts ER5, ER6, ER7, ER8, ER9, and ER10 disconnect the various portions of the line MA+, so that each stepping magnet can be controlled only from its related set of contacts at this time. The stepping magnets for all denominations step in unison until their related wiper arms rest on the zero contacts and their operating circuits are broken. When all the wiper arms rest on the zero contacts, the circuit over the relay Q and interrupter relay contacts INT2 is broken, and relay Q is deenergized. Relay ER, when energized, closes contacts ER5' in a circuit which is used to short-circuit relay ZO. However, this circuit is not completed until the relay Q is deenergized and allows contact Q1 to be closed.

When both the contacts Q1 and ER5' are closed, the ZO relay is short-circuited, and when the short circuit is complete, a lamp ZOL glows to indicate that an operation of entering an amount in the product accumulator has finished.

When the relay ZO is short-circuited, it becomes deenergized and causes the contacts ZO2 to break the circuit which energizes the interrupter magnet INT. It opens the contact ZO3 to break the circuit which sends impulses to the stepping magnets and the accumulator actuating magnets, and, at ZO4, breaks the circuit to the relay ER. At the same time, the deenergization of the ZO relay opens the contact ZO1, which removes the short circuit from the BB relay and allows the BB relay to become energized to begin a cycle of halving and doubling.

It should also be noted that relay ZO will be energized during the successive halving and doubling operations each time the derived multiplier term is odd, and will cause an entry in the product accumulator and a delaying of the operation of relay BB in the same manner as described at this point as resulting from the entry of an odd-valued multiplier from the keyboard.

It is thus seen that the operation which takes place when the multiplier is odd consists in delaying the halving and doubling operation and initiating an entry of the multiplicand value into the product accumulator, and this operation will be the same whenever the multiplier amount is odd.

The operation of halving and doubling the multiplier and the multiplicand will be repeated until the zero storing relay in each of the orders is energized. This will close a circuit over the zero line to the relay R. In the present instance, the R relay has two windings, one controlled from the zero line in the units order and one from the zero line in the tens order, and when both windings are simultaneously energized, they will open the contact R1 to remove potential from the line A, which will deenergize all the aA relays in the multiplier and the multiplicand and will also cause the relay R to be deenergized.

Rectifiers REC10 and REC11 are included in the zero lines to prevent the current from one zero line from feeding back over the winding connected to the other zero line. These rectifiers prevent feedbacks from occurring, but do not interfere with the normal parallel feed from the two zero storing relays to the windings of the R relay.

At this time, the machine has completed a problem and has been prepared for a new problem, and only the accumulator and the relay OPR remain out of zero position and energized, respectively.

Means are provided to enable tens carries to be made when the entries into any denominational order of the accumulator exceed the capacity of that denomination. These means are similar in all denominational orders, so that the explanation of a transfer operation in one order will apply to any other order.

If the accumulator wheel in the units of pounds denominational order M (Fig. 6E) stands at 7 and an entry of 5 is made therein, a tens carry to the tens of pounds order will be necessary. During the entry of the value 5, as the numeral wheel passes from its 9 to its 0 position, the tooth 79 connected thereto will engage the projecting piece 89 on the contact 88 (Fig. 8) to close the contact momentarily. The closing of the contact 88 completes a circuit (Figs. 6D and 6E) from — battery over line —ST, closed contact 88, the winding of relay COM, contact T2, which is closed, over the winding of relay Y, and over contact SO4, which is closed, to + battery. This energizes relay COM and relay Y. Relay COM, when energized, closes a contact COM1 to complete a holding circuit for itself and for the Y relay from — battery, over line ST—, over contact COM1, which is closed, the winding of the relay COM, line ST+, contact T2, which is closed, the winding of the Y relay, contact SO4, which is closed, to + battery. Relay COM, when energized, also closes contact COM2 to prepare a circuit to the actuating magnet 72MN of the next higher denominational order, but this circuit is not completed at this time.

Any or all carry-over relays COP, CON, COM, COH, COL, or COKD may be operated in this manner, and, if any one or more operate, the Y relay operates also.

Relay Y, when energized, shifts its contact Y1 (Fig. 6A) from lower to upper position to include relay T in the energizing circuit for relay ER, which circuit is closed when the series of contacts P2 to KD2 is closed as the entry in the accumulator is completed and transfers resulting from the entry have been prepared. The circuit completed over the winding of the T relay is as follows: — battery, the winding of the T relay, contact Y1 in its upper position, the series of contacts P2 to KD2, which are closed, the winding of relay ER, contact ZO4, which is closed, to + battery. The relay T energizes very quickly, before the relay ER, which is slow to energize, can do so, and the operation of the T relay breaks, at T2, the energizing line for relay Y, which causes contact Y1 to shift to its lower position and momentarily deenergizes the relay ER before it can be completely energized. If there are any tens carry operations resulting from the first tens carry operation, the relay Y is energized again to shift the contact Y1 to its upper position before the contact Y1 in its lower position can cause the relay ER to be energized completely. This repeated shifting of the contact Y1 will prevent the relay ER from energizing until after all carry-over operations have taken place and contact Y1 remains in its lower position.

When relay T is energized, it opens contacts T2 to break the holding circuit for the relay Y and any relays, as CON, which had been energized in the previous amount-entering operation. Relay T also closes the contact T1 (Fig. 6D) to complete a circuit from — battery, over the resistance r4, contact T1, which is closed, contact CON2, which is closed, the actuating magnet 72MP, contact ER2, which is closed, the contact associated with the key RE1, which is closed, contact ER3, which is closed, to + battery. This causes the accumulator actuating magnet 72MP to be energized once to enter a unit in the hundreds of pounds denominational order. A condenser C1 is connected across the actuating magnet 72MP and serves, with the resistance r4, to delay the action of the magnet 72MP slightly to allow time for the control relay CON to be released and the contacts T2 to be reclosed before the wheel is operated. This will insure that the control relays can indicate a carry if one should result from the previous carry. After the carry-over operations have been completed, contact Y1 will remain in its lower position, and the relay ER will have time to energize. Upon the energization of relay ER, the operations continue as described above.

Figure 6D:
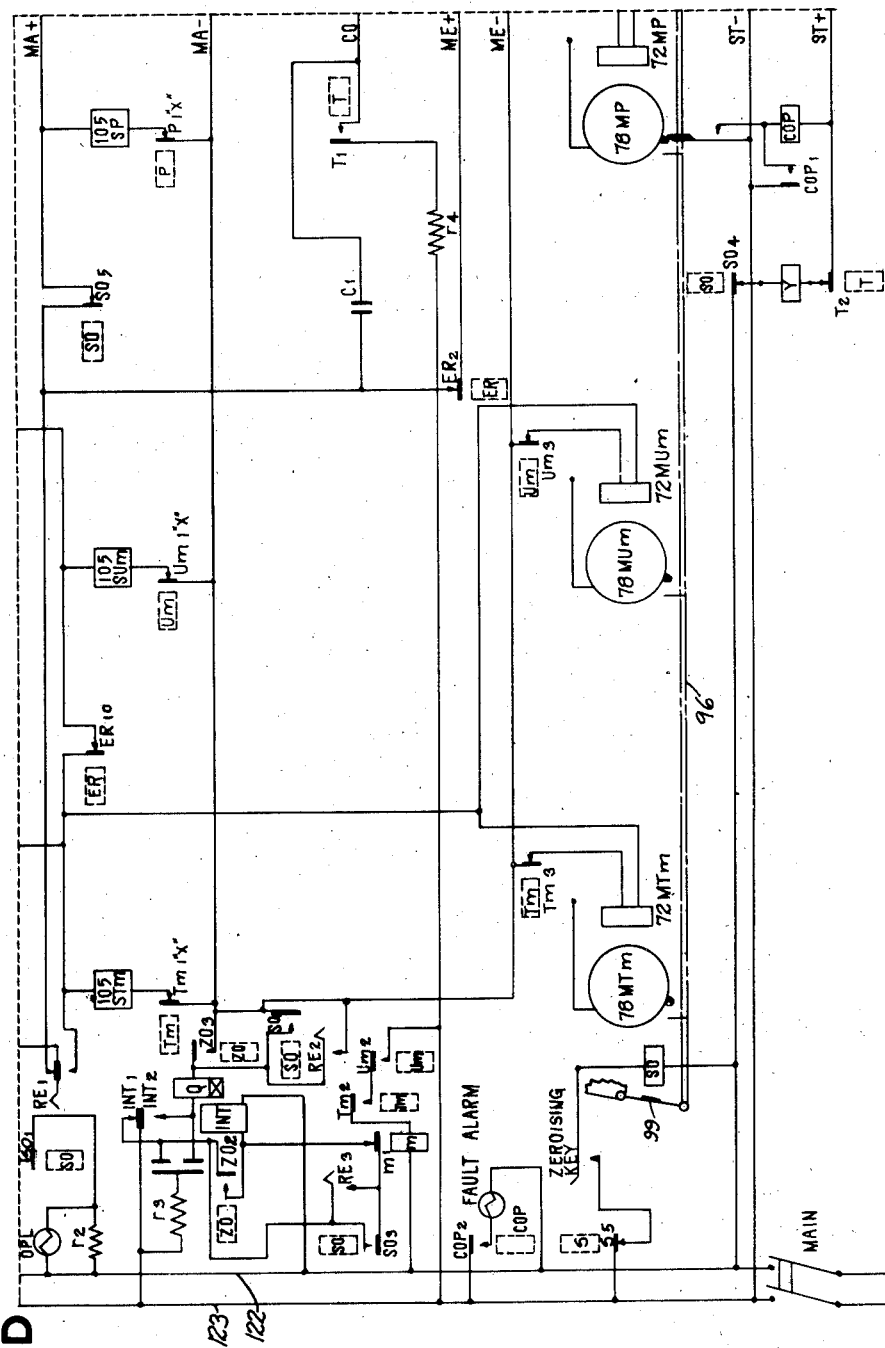
Figure 6E:
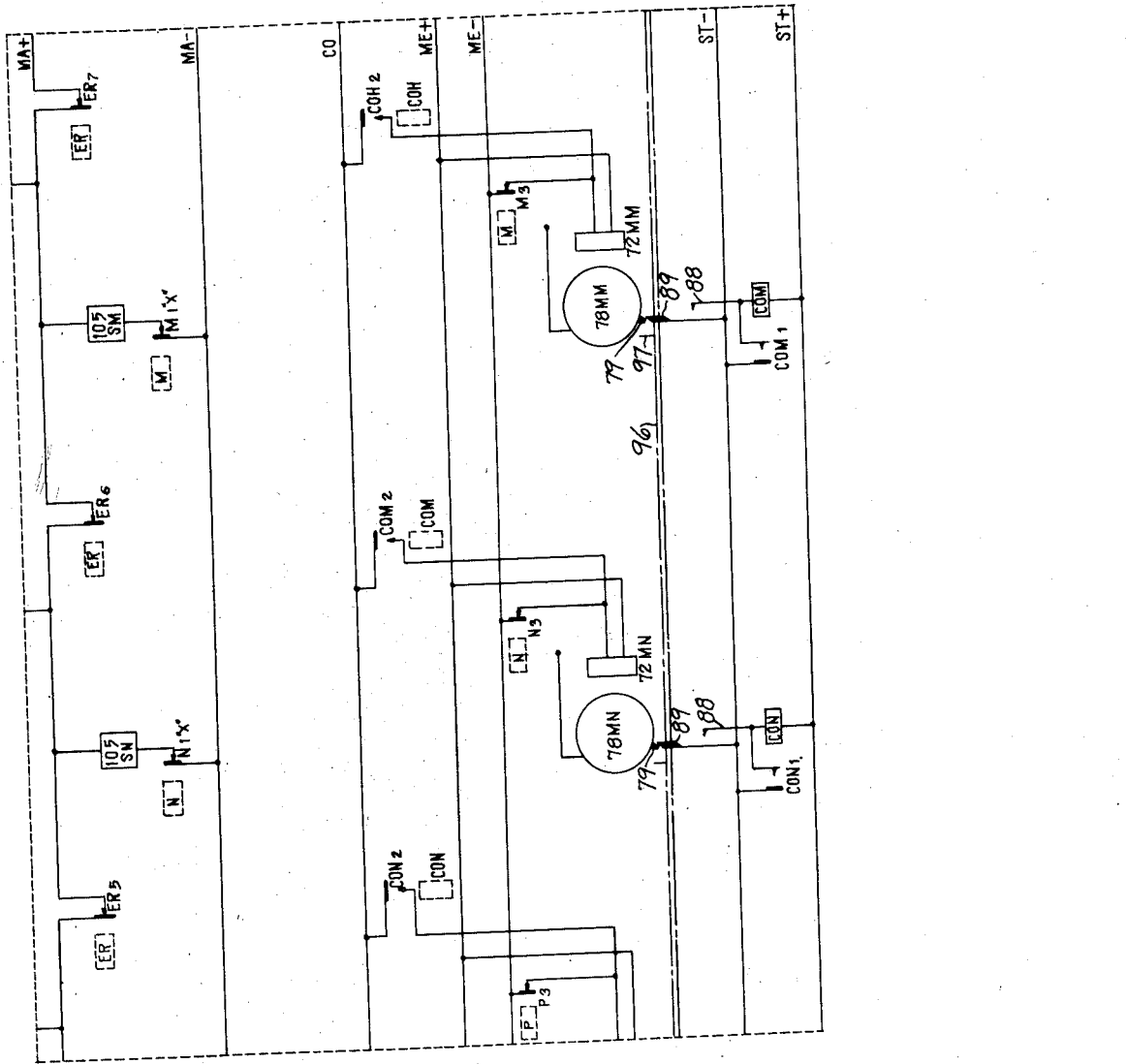
Figure 6F:
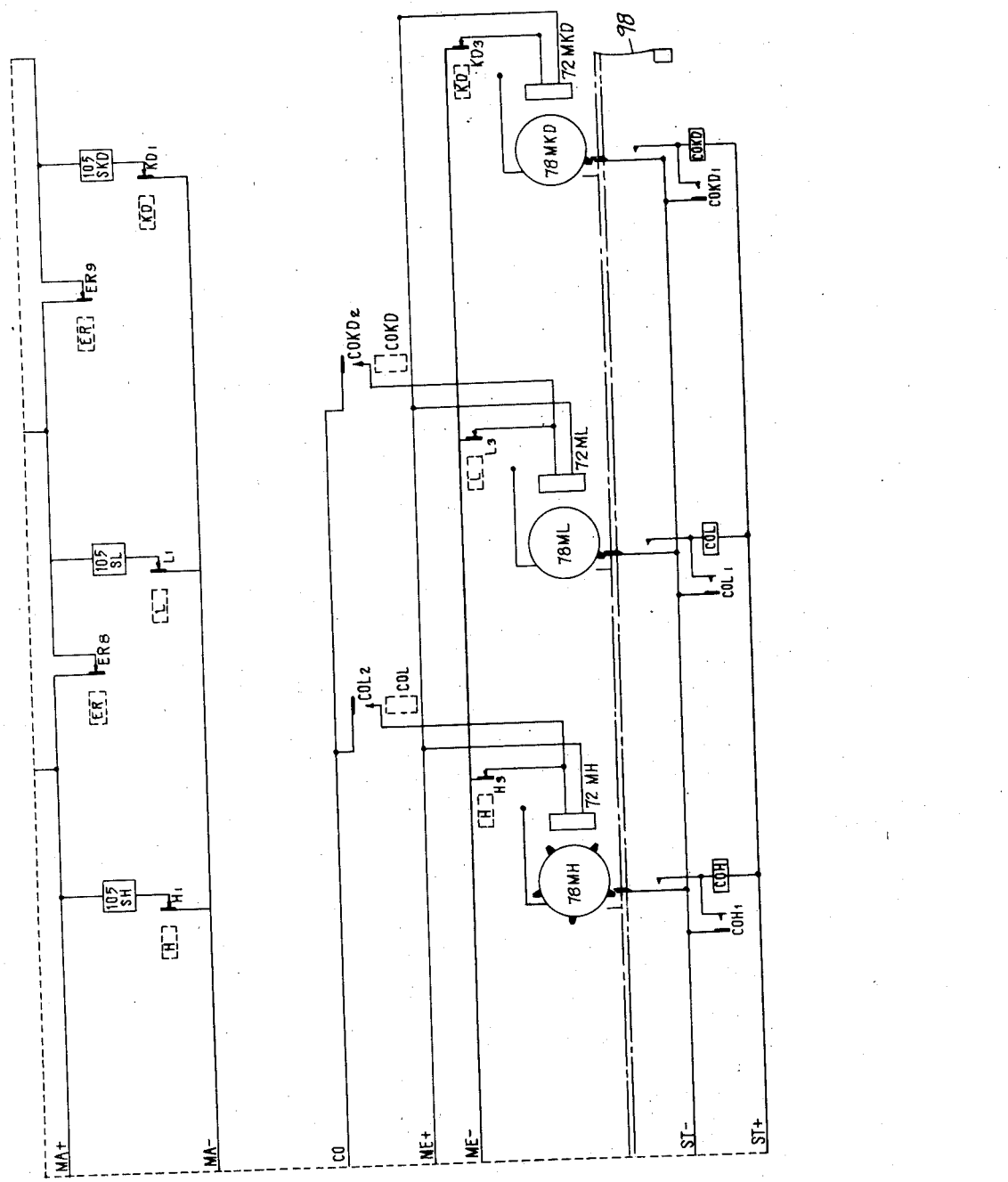

As has been pointed out above, after the relay R has been energized at the completion of a multiplication operation, only the product accumulator remains out of zero position, and the relay OPR remains energized. To bring the accumulator to zero position and to release the relay OPR, a zeroizing key is provided (Fig. 6D). This key, when operated, closes a circuit from — battery, over contact S5, which is closed, contact closed by the zeroizing key, the magnet SO, to + battery. The magnet SO energizes and opens contact SO1, which breaks the holding circuit for relay OPR. Contact SO3 is closed and completes a circuit from + battery, over the operating magnet INT for the interrupter relay, over the contact m1, which is closed, over the contact SO3, which is closed, over the switch INT1, to — battery. This causes an operation of the interrupter relay similar to that explained before. Magnet SO closes the contact SO2 to complete a circuit from — battery, over the contacts INT2, the winding of the Q relay, contact SO2, which is closed, over the contact P3, to the actuating magnet 72MP for the hundreds of pounds order of the accumulator, over contact ER2, which is closed, the contact RE1 associated with the key RE, which is closed, the contact ER3, which is closed, to + battery. This will supply a series of stepping impulses to the actuating magnet 72MP. As explained earlier herein, the other actuating magnets for the accumulator are connected over contacts, as P3, to the interrupter relay and will also have stepping impulses applied thereto.

Contact SO5 is operated and opens a circuit for the wiper arm stepping magnets to prevent their operation at this time. Contact SO4 is operated to prevent the operation of the relay Y and any carry-over which might be signalled by the numeral wheels returning to zero position.

When the magnet SO energizes, it also shifts the bar 96 to the right to move projections 97 into the path of the teeth 79 fastened to the numeral wheels. This prevents the numeral wheels from moving past their zero positions. When all the wheels have reached zero, which is determined by an inspection of the wheels, the key may be released by the operator, and the machine will be in condition to perform a new problem.

Means are also provided to indicate the values of the digits entered into the multiplier orders. This may be done by operating the key RE, which operates a plurality of contacts RE1, RE2, and RE3. Contact RE3, when closed by the key, closes a circuit from + battery, over the winding of the magnet INT for the interrupter relay, over contact m1, which is closed, over contact RE3, which is closed, over the interrupter contacts INT1, to — battery. This sends a series of stepping impulses to the actuating magnets 72MT$m$ and 72MU$m$.

Contact RE2, when closed by the key, completes a circuit from — battery, over the interrupter contacts INT2, over the winding of the relay Q, over the contacts RE2, which are operated, over the contact T$m$3, which is closed, over the winding of the actuating magnet 72MT$m$, over RE1, which is operated, over ER3, which is in its lower position, to + battery. A similar circuit extends through the winding of the actuating magnet 72MUm, and these magnets will step their associated indicating wheels to indicate the multiplier digits. To cause the stepping of the actuating magnets, a circuit is completed from — battery, over the interrupter contacts INT2, the winding of the Q relay, contact RE2, which is operated, over contact Tm1"x", which is closed, over the stepping magnet 105-STM, contact RE1, which is operated, and over contact ER3, which is in its lower position, to + battery. This causes the wiper arm for the tens denomination of the multiplier to be stepped to locate a digit line having potential thereon.

At the same time, a similar circuit is completed through the stepping magnet 105SUm to operate the wiper arm in that denomination. When the wiper arms engage contacts having potential thereon, control relays Tm and Um are energized and open contacts Tm1"x", Tm3, Um1"x", and Um3 to release the stepping magnets and the actuating magnets from the control by the interrupter contacts INT2.

Control relays Tm and Um close contacts Tm2 and Um2 when they are energized. This will indicate a completion of the entry of the multiplier values. When contacts Tm2 and Um2 are closed, they will complete a circuit from — battery, over Um2, which is closed, Tm2, which is closed, and m relay, to + battery. The relay m energizes and breaks, at contact m1, the energizing circuit for the operating magnet INT for the interrupter relay. The key RE is now restored.

At this time, the wheels for the multiplier indicating means will indicate the value of the multiplier.

The wiper arms for the rotary control switching means in these orders will remain in their moved positions and will be returned to their normal positions in the next operation of the machine after an entry has been made into the accumulator and when the other wiper arms are being restored to their zero positions, as explained above.

The indication of the multiplier may be retained during the multiplying operation, or this indicating means may be returned to zero before multiplication begins, by depression of the zeroizing key before the key OP is operated.

*Operation*

The operation of the device in the performance of the problem of multiplying 36 × £2–13–4 will now be explained in connection with the timing chart of Figs. 13A and 13B, which shows the relays that are energized in the different stages of the operation and the controls that are effective.

In the charts, the vertical columns represent the several multiplier and multiplicand denominations, the product accumulator, and the operation control and show in the various lines thereof the particular relays or values which are effective at that stage of the multiplication. The arrows are used to show when one relay controls the energization of another.

The first operation is to close the main switch to apply potential to the machine.

Next, the start key ST is operated. This completes a circuit to energize relay S, which applies + potential to lines A and B and causes relay er to close circuits to the 0aA relays of the multiplicand orders P, N, M, HL, and KD to energize these relays. Line 1 shows the conditions at this time, with control relays S and er energized, the 0aA relays energized in the multiplicand orders, and the product accumulator standing at zero.

The factors are entered by means of the keyboard and cause the 3aA, 6aA, 2aA, 1aA, 3aA, and 4aA relays to be energized in orders TM, UM, M, H, L, and KD, respectively, and, as soon as these relays are energized to close their contacts, they will cause their related signal relays to be energized wherever necessary. Line 2 shows the condition at this time with the above aA relays energized, the ZA relay energized to indicate a borrow, and the ZM relay energized to indicate a carry, and the control relays S and er energized. The relays, as ZA and ZM, execpt ZO, are held over contact K2 until relay K is energized.

The factors having been entered, the operating key OP is operated to initiate the multiplying operation. Key OP causes relay OPR to be energized to remove + from the a line, to release relays S and er, and to prevent the automatic reenergization of the 0aA relays of the multiplicand orders. Since the units order multiplier digit is even, the relay OPR initiates the halving and doubling operation by causing the energization of relay BB, which applies + potential to the C line to cause the half and double transfer relays to be energized from their related aA relays and prepares holding circuits for the half and double transfer relays which are also effective to cause the slow relay GR to be energized as soon as all half or double transfer relays which have been brought into circuit are energized. Line 3 shows the conditions which exist just prior to the energization of relay GR, which is slow to operate. The half and double transfer relays 1/6, 3/8, 0/1, 0/1, 4/5, 0/1, 6/7, and 8/9 have been energized in the TM, UM, P, N, M, H, L, and KD orders, respectively, from the energized aA relays therein; signal relays ZA and ZM remain energized; control relays OPR and BB are energized; and the product accumulator is at zero.

When the slow control relay GR becomes energized, it removes + potential from line B to remove the holding circuit for the aA relays in all orders and also removes + potential from the line C. Control relay GR releases relay BB and causes slow control relay HJR to be energized. The conditions which exist when relay GR is energized and before slow relay HJR is energized are illustrated in line 4. The previously energized aA relays have all been deenergized; signal relay ZA and ZM remain energized; control relays OPR and GR are energized; and the product accumulator remains at zero.

Slow relay HJR, when operated, applies + potential to the line B to restore the holding circuits for the aA relays and applies + potential to the H or J lines to cause the energization of aA relays according to half or double their previous value. Relay HJR also energizes relay K. Line 5 shows the conditions which exist before slow relay K is energized. Relays 1aA, 8aA, 0aA, 0aA, 5aA, 0aA, 6aA, and 8aA are energized in orders TM, UM, P, N, M, H, L, and KD, respectively, as a result of the halving and doubling operation; fast signal relays ZA, ZN, ZH, and ZL are energized from their respective aA relays, and ZM remains energized; control relays OPR, GR, and HJR are energized; and the product accumulator remains at zero.

Slow relay K, when energized, removes the holding circuit for the half and double transfer relays and for the signal relays which were retained energized by their holding circuits and releases relays GR and HJR. The release of relay GR closes the circuit of slow relay BB to cause this relay to be energized to start another halving and doubling operation. Line 6 shows the conditions which exist after the relay K has been energized and before relay BB has been reenergized. The aA relays of the several orders remain energized; their half and double transfer relays have all been released; and fast signal relay ZM, which was held from the previous operation, is released. The other signal relays are held at this time from their associated aA relays. The product accumulator remains at zero.

Since the units multiplier digit is still even and signal relay ZO is not energized, relay BB can be energized to start another sequence of operation of control relays BB, GR, HJR, and K to provide for a further halving and doubling operation. Lines 7, 8, 9, and 10 show the relays energized during this operation.

The halving and doubling operation shown in lines 7 through 10 produces an odd value in the units order of the multiplier, which causes the fast signal relay ZO to be energized to short-circuit slow relay BB to prevent its reenergization upon the release of relay GR and to cause the operation of the fast operating amount-entering means to cause an entry of the amount in the various orders of the multiplicand to be made in the product accumulator. Line 11 shows the conditions which exist at the end of the registering operation before slow relay ER has been energized. The aA and signal relays in the various orders remain as in line 10, and the product accumulator shows the entry of 010134 in the proper orders thereof.

When slow relay ER is energized to terminate the entering operation, it short-circuits relay ZO, which will become deenergized to terminate an operation of the amount-entering means, and also removes the short circuit from slow relay BB to allow relay BB to become reenergized. The conditions prevailing at this time are shown in line 12.

The reenergization of slow relay BB again puts + potential on line C to cause the related half and double transfer relays to be energized, as shown in line 13. The fast signal relay ZO is energized from relay 9aA at this time but is of no effect, as it becomes quickly deenergized with relay 9aA during the halving operation. The conditions which exist during this halving and doubling operation are shown in lines 13 through 16.

At this time, the multiplier has been reduced to the value of 4, and two more halving and doubling operations are performed before the value of the multiplier becomes odd and causes an amount entry to be made in the product accumulator. Since these halving and doubling operations are similar to those above, they will not be explained in detail. Line 17 shows the conditions of the various relays after the halving and doubling operation in which the multiplier value has become odd. Slow relay K has operated to release those signal relays which were held solely by their holding circuit, and fast signal relay ZO has been operated to prevent the energization of slow relay BB, which would normally occur when relay GR is released by relay K.

Signal relay ZO again renders the fast operating amount-entering means operative to enter the amount standing on the various multiplicand orders at this time, £5-6-8, into the product accumulator. During the entry of the amount in the pence order, the pence wheel will operate its transfer contacts to energize the fast relay COKD and fast relay Y, which prepares the relay T for operation at the termination of the amount-entering operation. After the amount has been entered, fast relay T is energized to cause the entry of the unit into the units of shillings order and to release relay COKD and momentarily release relay Y, which also releases relay T. The entry of the unit in the units of shillings order causes the transfer contacts of that order to close to energize fast relay COL and fast relay Y, which causes relay T to operate to allow the entry of a unit in the tens of shillings order and to release relay COL and momentarily release relay Y, which in turn releases relay T. The entry of the unit in the tens of shillings order will cause the operation of the transfer contacts to energize the fast relay COH and relay Y, which again energizes relay T to cause the entry of a unit in the units of pounds order and to cause the relays COH and Y to be deenergized. As the entry of the unit in the units of pounds order does not require a further transfer operation, relay Y will not be reenergized, and the circuit will be completed to slow relay ER to short-circuit relay ZO and terminate the entering operation. Line 18 shows the condition of the various components during the entering operation prior to the energization of relay ER after the last transfer has been accomplished. At this time, the product accumulator shows £96-00-0. Relays T and Y operate as many times as are required, rapidly, allowing no time for slow relay ER to operate until relay Y ceases to operate again.

Line 19 shows the conditions which exist when relay ER has short-circuited relay ZO but before slow relay BB has been energized.

When relay ZO has been short-circuited by relay ER, relay BB can be energized to start another halving and doubling operation similar to those described above. Lines 20 through 23 show the conditions which exist during the different stages of the halving and doubling operation.

When slow relay HJR applies potential to cause the aA relays to be energized from their related half and double transfer relays (line 22), the OaA relays in both orders of the multiplier are energized to complete circuits through relay R, which releases all relays except OPR and terminates the multiplying operation. The product accumulator now shows the final product, £96-00-0.

Relay OPR is released when the product accumulator is reset.

While the form of mechanism herein shown and described is admirably adapted to fulfill the objects primarily stated, it is to be understood that it is not intended to confine the invention to the form or embodiment herein disclosed, for it is susceptible of embodiment in various forms, all coming within the scope of the claims which follow.

What is claimed is:

1. In a machine of the class described, the combination of means for entering multiplier amounts; means for entering multiplicand amounts; non-accumulating type storing means settable according to multiplier amounts and controlled by said multiplier entering means; non-accumulating type storing means settable according to multiplicand amounts and controlled by said multiplicand entering means; retaining means cooperable with said storing means to retain therein the setting of the amounts; halving means operated from said multiplier storing means according to the setting thereof; doubling means operated from said multiplicand storing means according to the setting thereof; means controlled by said halving means to enter into the storing means half the amount which controlled the operation of the halving means; means controlled by said doubling means to enter into the multiplicand storing means twice the amount which controlled the operation of the doubling means; and control means for controlling the sequence of operation of the above means to cause the halving and doubling means to be operated from their related storing means which have been set, next to cause the retaining means to be ineffective and to release the set storing means to clear the amounts stored in the storing means, and then render the means operated by the halving and doubling means simultaneously operable to enter and set up in the storing means half and double the amounts respectively of the amounts cleared therefrom.

2. In a machine of the class described, the combination of a plurality of devices operable to enter the digits of a multiplier; a plurality of devices operable to enter the digits of a multiplicand; a plurality of storing relays individually energized to set up the digits of the multiplier and multiplicand; a plurality of circuits closable by said devices to energize said storing relays; a holding circuit for said storing relays to maintain the energization of those relays which have been energized; a plurality of halving relays; a plurality of doubling relays; circuits closable by the energized multiplier storage relays for selectively energizing the halving relays; circuits closable by the energized multiplicand storing relays for selectively energizing the doubling relays; circuits closable by the energized halving and doubling relays for energizing storing relays corresponding to half the multiplier and twice the multiplicand; and means for sequentially controlling the effectiveness of the circuits first to cause the circuit between the storing relays and the halving and doubling relays to cause the halving and doubling relays to be energized under control of the storing relays, next to momentarily break the holding circuit for the storing relays to clear the setting therefrom and then to send an impulse over the circuits closed by the halving and doubling relays to cause the simultaneous energization of storing relays corresponding to half the released multiplier value and twice the released multiplicand value.

3. In a machine of the class described, a group of storing relays corresponding to digit values; a group of halving relays selectable according to values; a first impulse line; a second impulse line; a pair of contacts related to each halving relay, and closed when their related relay is energized, one of said contacts connecting the first impulse line to one of said storing relays having a value equal to half of the value, to the nearest whole number, represented by the halving relay and the other of said contacts connecting the second impulse line to one of said storing relays having a digit value five greater than the value of the relay connected to said first impulse line; and means for selectively impressing an impulse on said first or said second impulse line to cause the relay connected thereto to be energized.

4. In a machine of the class described, a group of storing relays corresponding to digit values; a group of doubling relays; a first impulse line; a second impulse line; a pair of contacts related to each doubling relay, and closed when their related relay is energized, one of said contacts connecting the first impulse line to one of said storing relays having a value equal to twice the values represented by the doubling relay and the other of said contacts connecting the second impulse line to one of said storing relays having a digit value one greater than the value of the storing relay connected to said first impulse line; and means for selectively impressing an impulse on said first or said second impulse line to cause the storing relay connected thereto to be energized.

5. In a machine of the class described, the combination of means to enter multiplier and multiplicand amounts; means for storing multiplier amounts; means for storing multiplicand amounts; halving means operated under control of the multiplier storing means and operable to enter into said multiplier storing means one-half the amount previously stored therein; doubling means operated under control of the multiplicand storing means and operable to enter into the multiplicand storing means twice the amount previously stored therein; clearing means for the storing means; clearing means for the halving and doubling means; and cyclically operable control means for coordinating the operation of the above means to perform a halving and doubling operation by first causing the halving and doubling means to be operated from their related storing means, next operating the clearing means for the storing means to clear therefrom the amounts stored therein, then causing the halving and doubling means to enter into the multiplier and multiplicand storing means respectively half and double the amounts cleared therefrom and finally operating the clearing means for the halving and doubling means to clear these means, and at the same time automatically initiating another operation of the control means to cause further halving and doubling operations to take place.

6. In a machine of the class described, the combination of means to enter multiplier and multiplicand amounts; means for storing multiplier amounts; means for storing multiplicand amounts; halving means operated under control of the multiplier storing means and operable to enter into said multiplier storing means one-half the amount previously stored therein; doubling means operated under control of the multiplicand storing means and operable to enter into the multiplicand storing means twice the amount previously stored therein; clearing means for the storing means; clearing means for the halving and doubling means; cyclically operable control means for coordinating the operation of the above means to perform a halving and doubling operation by first causing the halving and doubling means to be operated from their related storing means, next operating the clearing means for the storing means to clear therefrom the amounts stored therein, then causing the halving and doubling means to enter into the multiplier and multiplicand storing means respectively half and double the amounts cleared therefrom, and finally operating the clearing means for the halving and doubling means to clear these means, and at the same time automatically initiating another operation of the control means to cause further halving and doubling operations to take place; product accumulating means; denominational amount transferring means for entering values into different denominational orders of said product accumulating means under control of said multiplicand storing means; further control means controlled by said multiplier storing means and operable, whenever the amount in said storing means is odd, to initiate an operation of the amount transferring means to cause an entry in the various denominational orders of the product accumulator of the amount in the multiplicand storing means and simultaneously to prevent an operation of the cyclically operable control means; and means controlled by the various denominational amount transferring means and operated as soon as the entry in the various denominational orders of the product accumulator has been completed, for controlling said further control means to cause the cyclic operation of the control means to begin.

7. In a machine of the class described, means for entering a multi-digit multiplier; a multiplier entry receiving means comprising a plurality of denominational groups of digit storing relays selectively energized according to entered multiplier digits; denominational groups of halving relays selectively energized from corresponding denominational groups of storing relays; a first set of impulse lines, one line of which is associated with each group of halving relays; a second set of impulse lines, one line of which is associated with each group of halving relays; a pair of contacts related to each halving relay and closed when their related relay is energized, one of said contacts connecting the first impulse line associated therewith to the storing relay in the denomination related to its halving relay, having a digit value equal to the whole number part of half the value of the storing relays which cause the energization of the halving relay, and the other of said contacts connecting the second impulse line associated therewith to a storing relay in the same denominational group but having a value higher by five than the one connected to the first impulse line; means for clearing the storing relays after they have operated their halving relays; means normally sending an impulse to each of said first set of impulse lines to cause the energization of the storing relays; and means controlled by the odd value storing relays of one denominational order to cause the impulse sending means to send an impulse over the impulse line of the second set in the next lower denomination instead of over the impulse line of the first set of impulse lines, to take care of a borrow of a unit from the next higher denominational order.

8. In a machine of the class described, means for entering a multi-digit multiplicand; a multiplicand entry receiving means comprising a plurality of denominational groups of digit storing relays selectively energized according to entered multiplicand digits; denominational groups of doubling relays selectively energized from corresponding denominational groups of storing relays; a first set of impulse lines, one line of which is associated with each group of doubling relays; a second set of impulse lines, one line of which is associated with each group of doubling relays; a pair of contacts related to each doubling relay and closed when their related relay is energized, one of said contacts connecting the first impulse line associated therewith to the storing relay in the denomination related to its doubling relay, having a digit value equal to twice the value of the storing relays which cause the energization of the doubling relay, and the other of said contacts connecting the second impulse line associated therewith to a storing relay in the same denominational group but having a value higher by one than the one connected to the first impulse line; means for clearing the storing relays after they have operated their doubling relays; means normally sending an impulse to each of said first set of impulse lines to cause the energization of the storing relays; and means controlled by the storing relays of one denominational order having a value, which if doubled, will exceed the capacity of the denomination, to cause the impulse sending means to send an impulse over the impulse line of the second set associated with the next higher denomination instead of over the impulse line of the first set of impulse lines, to take care of a tens carry of a unit resulting from the doubling operation in the next lower denominational order.

9. In a machine of the class described, the combination of a plurality of devices operable to enter the digits of a multiplier; a plurality of devices operable to enter the digits of a multiplicand; a plurality of storing relays individually energized to set up the digits of the multiplier and multiplicand; a plurality of circuits closable by said devices to energize said storing relays; a holding circuit for said storing relays to maintain the energization of those relays which have been energized; a plurality of halving relays; a plurality of doubling relays; circuits closable by the energized multiplier storing relays for selectively energizing the halving relays; circuits closable by the energized multiplicand storing relays for selectively energizing the doubling relays; circuits closable by the energized halving and doubling relays for energizing storing relays corresponding to half the multiplier and twice the multiplicand; means to apply an impulse to the circuits closed by the halving and doubling relays to cause the storing relays in these circuits to be energized simultaneously regardless of their digit value; and means for sequentially controlling the effectiveness of the circuits first to cause the circuit between the storing relays and the halving and doubling relays to cause the halving and doubling relays to be energized under control of the storing relays, next to momentarily break the holding circuit for the storing relays to clear the setting therefrom, and then operate the impulse applying means to send an impulse over the circuits closed by the halving and doubling relays to cause the simultaneous energization of storing relays corresponding to half the released multiplier value and twice the released multiplicand value.

10. In a machine of the class described, the combination of means for entering multipliers; means for entering multiplicands; multiplier entry receiving means including a plurality of devices having digit values and selectively settable according to the entered multiplier; multiplicand entry receiving means including a plurality of devices having digit values and selectively settable according to the entered multiplicand; halving means selectively operated under control of the set devices in the multiplier entry receiving means; doubling means selectively operated under control of the set devices in the multiplicand entry receiving means; means for clearing the setting of the devices in the multiplier and multiplicand entry receiving means; means controlled by said halving means to select the devices in the multiplier receiving means which correspond to the digits of half the amount which controlled the halving means; means controlled by said doubling means to select the devices in the multiplicand entry receiving means which correspond to digits of twice the amount which controlled the doubling means; means to cause the selected devices in the multiplier and multiplicand entry receiving means to be set simultaneously regardless of their digit value; and control means for controlling the sequence of operation of the above means to cause first, the halving and doubling means to be operated from the set devices in the multiplier and multiplicand entry receiving means to select other devices to be set therein, next the clearing means to be operated to clear the entry receiving means, and then the means to set the selected devices to be operated to cause an entry into the multiplier and multiplicand entry receiving means respectively of half the multiplier which was cleared therefrom and double the multiplicand which was cleared therefrom.

11. In a machine of the class described, the combination of means to enter an amount; a plurality of storage devices, each representing a digit of a notation and selectively settable under control of said entering means according to the digits of an amount; means to clear the storage devices; a plurality of devices related to the storage devices for making a further selection of the storage devices according to different amounts representing terms of geometrical progression having a ratio of 2 and of which the entered amount is one term; means, including elements in the storage devices, for enabling the selected and set storage devices to cause the selective operation of the related devices; means, including elements in the related devices, for causing the selection and setting of the storage devices corresponding to the digits of the amount representing the term in the progression which follows the previously stored amount; and sequence of operation control means for causing the means in the set storage devices to selectively cause the operation of the related devices, the clearing means to operate and clear the storage devices, and the means in the operated related devices to select and set storage devices corresponding to the amount in the progression which follows the previously stored amount.

12. In a machine of the class described, the combination of means to enter an amount; a plurality of storage devices, each representing a digit of a notation and selectively settable under control of said entering means according to the digits of an amount; means to clear the storage devices; a plurality of devices related to the storage devices for making a further selection of the storage devices according to the digits of the whole number part of half of the previously stored value; means in the storage devices for enabling the selected and set storage devices to cause the selective operation of the related devices; means in the related devices for causing the selection and setting of the storage devices corresponding to the digits of the whole number part of half the value of the previously stored value; and sequence of operation control means for causing the means in the set storage devices to selectively cause the operation of the related devices, the clearing means to operate and clear the storage devices, and the means in the operated related devices to select and set storage devices corresponding to the whole number part of half the previously stored value.

13. In a machine of the class described, the combination of means to enter an amount; a plurality of storage devices, each representing a digit of a notation and selectively settable under control of said entering means according to the digits of an amount; means to clear the storage devices; a plurality of devices related to the storage devices for making a further selection of the storage devices according to the digits of double the previously stored value; means in the storage devices for enabling the selected and set storage devices to cause the selective operation of the related devices; means in the related devices for causing the selection and setting of the storage devices corresponding to the digits of double the value of the previously stored value; and sequence of operation control means for causing the means in the set storage devices to selectively cause the operation of the related devices, the clearing means to operate and clear the storage devices, and the means in the operated related devices to select and set storage devices corresponding to double the previously stored value.

14. In a machine of the class described, the combination of means to enter an amount; a plurality of storing relays, each relay representing a digit of a notation and selectively energizable by said entering means; holding circuits for said storing relays; a plurality of relays related to said storing relays for making further selections of the storing relays according to the digits of amounts representing terms of a geometrical progression having a ratio of two and of which the entered amount is one term; circuits for selectively energizing the related relays, said circuits including contacts closed by energized storing relays; circuits for selectively energizing the storing relays corresponding to the digits of an amount representing the term of the progression which follows the term previously stored in the storing relays and including contacts closed by the energized related relays; and sequence control means for first completing the circuits over the closed contacts of the storing relays to energize the selected related relays, next interrupting the holding circuits for the storing relays to clear the amount therefrom, and then completing the circuits over the contacts closed by the related relays to energize the storing relays corresponding to the amount of the term in the progression which follows the amount cleared from the storing relays.

15. In a machine of the class described, the combination of means to enter an amount; a plurality of storing relays, each relay representing a digit of a notation and selectively energizable by said entering means; holding circuits for said storing relays; a plurality of halving relays; circuits for selectively energizing the halving relays, said circuits including contacts closed by energized storing relays; circuits for selectively energizing the storing relays corresponding to the digits of the whole number part of half the amount stored in the storing relays and including contacts closed by the energized halving relays; and sequence control means for first completing the circuits over the closed contacts of the storing relays to energize the selected halving relays, next interrupting the holding circuits for the storing relays to clear the amount therefrom, and then completing the circuits over the contacts closed by the halving relays to energize the storing relays corresponding to the digits of the whole number part of half the amount cleared from the storing relays.

16. In a machine of the class described, the combination of means to enter an amount; a plurality of storing relays, each relay representing a digit of a notation and selectively energizable by said entering means; holding circuits for said storing relays; a plurality of doubling relays; circuits for selectively energizing the doubling relays, said circuits including contacts closed by said energized storing relays; circuits for selectively energizing the storing relays corresponding to the digits of double the amount stored in the storing relays and including contacts closed by the energized doubling relays; and sequence control means for first completing the circuits over the closed contacts of the storing relays to energize the selected doubling relays, next interrupting the holding circuit for the storing relays to clear the amount therefrom, and then completing the circuits over the contacts closed by the doubling relays to energize the storing relays corresponding to the digits of double the amount cleared from the storing relays.

17. In a machine of the class described, the combination of means to enter an amount; a plurality of storing relays, each relay representing a digit of a notation and selectively energizable by said entering means; holding circuits for said storing relays; a plurality of relays related to said storing relays for making further selections of the storing relays according to the digits of amounts representing terms of a geometrical progression having a ratio of two and of which the entered amount is one term; holding circuits for said related relays; circuits for selectively energizing the related relays, said circuits including contacts closed by said energized storing relays to selectively connect said related relays to a first set of impulse lines; circuits for selectively energizing the storing relays corresponding to the digits of an amount representing the term of the progression which follows the amount stored in the storing relays and including contacts closed by the energized related relays to selectively connect said storing relays to a second set of impulse lines; and sequence control means for first impressing an impulse on the first set of impulse lines and over the closed contacts of the storing relays to the circuits to the selected related relays to cause them to be energized, next interrupting the holding circuits for the storing relays to clear the amount therefrom, impressing an impulse on the second set of impulse lines and then over the contacts closed by the related relays to the circuits to the storing relays to cause the storing relays corresponding to the amount of the term in the progression which follows the amount cleared from the storing relays to be energized, and then interrupting the holding circuits to the related relays.

18. In a machine of the class described, the combination of a first plurality of denominational groups of storage devices individually operable to store the digits of an amount expressed in the decimal notation; a second plurality of denominational groups of storage devices individually operable to store the digits of an amount expressed in different notations; multiplier entering means to control the devices of the first plurality of denominational groups of devices to cause the operation of those devices which correspond to the digits of a multi-digit amount expressed in a decimal notation; multiplicand entering means to control the devices of the second plurality of denominational devices to cause the operation of those devices which correspond to the digits of a multi-digit amount expressed in said different notations; means to retain the operated devices in the first and second plurality of denominational groups of storage devices in operated condition; halving means operated under control of the devices of the first plurality of denominational groups of devices and operable to cause the storage devices in said first plurality of denominational groups of devices to be selectively operated according to the digits of the whole number part of half of the previously stored amount; doubling means operated under control of the devices of the second plurality of groups of denominational devices and operable to cause the storage devices in said second plurality of deonminational groups of devices to be selectively operated according to the digits of twice the previously stored amount; a product accumulator having denominational elements corresponding to the denominations of said second plurality of denominational groups of storage devices; actuating means for said product accumulator; means controlled from the storage devices of the different denominational groups of the second plurality of denominational groups for rendering the actuating means ineffective to actuate the corresponding element of the accumulator when the amount represented by the operated storage device of that denomination has been entered in the accumulator; halving and doubling operation control means sequentially operable to cause the operation of the halving and doubling means under control of the storage devices, next the release of the retaining means for the storage devices to clear the stored amount therefrom, then the operation of the storage devices under control of the halving and doubling means to set up half and double the previously stored amounts, and thereafter to cause the automatic initiation of a further operation of the sequentially operable control means to cause further halving and doubling operations to take place; further control means controlled by the odd value storage devices in the lowest denominational group of the first plurality of denominational groups of storage devices and rendered operable thereby to control the actuating means to initiate an entering operation under control of the operated storage devices of the second plurality of devices and to control the sequentially operable control means to prevent the automatic initiation of a further halving and doubling operation; means controlled by the means which renders the actuating means ineffective for causing the initiation of a further halving and doubling operation as soon as the entry of the amount in the product accumulator has been completed; and means controlled by the storage devices representing zero in the different denominations of the first plurality of denominational groups of devices for terminating further operation of the halving and doubling operation control means and the actuating means upon the simultaneous operation of all these storage devices.

FRANK REGINALD SAXBY.